US010467907B2

(12) United States Patent
Pilkington et al.

(10) Patent No.: US 10,467,907 B2
(45) Date of Patent: Nov. 5, 2019

(54) INITIALIZATION AND SAFETY MAINTENANCE STRATEGY FOR PLATOONING VEHICLES

(71) Applicant: Bendix Commercial Vehicle Systems LLC, Elyria, OH (US)

(72) Inventors: Andrew J. Pilkington, Avon Lake, OH (US); T. Stephen Miller, Jr., Lagrange, OH (US); Scott Szymczak, Elyria, OH (US); Michael K. Lesher, Elyria, OH (US); Adedapo A. Alabi, Elyria, OH (US)

(73) Assignee: Bendix Commercial Vehicle Systems LLC, Elyria, OH (US)

( * ) Notice: Subject to any disclaimer, the term of this patent is extended or adjusted under 35 U.S.C. 154(b) by 0 days.

(21) Appl. No.: 15/856,390

(22) Filed: Dec. 28, 2017

(65) Prior Publication Data

US 2019/0206260 A1    Jul. 4, 2019

(51) Int. Cl.
  *G08G 1/00* (2006.01)
  *G06K 9/00* (2006.01)
  (Continued)

(52) U.S. Cl.
  CPC .............. *G08G 1/22* (2013.01); *B60Q 1/44* (2013.01); *B62D 15/025* (2013.01);
  (Continued)

(58) Field of Classification Search
  USPC .......................................................... 701/2
  See application file for complete search history.

(56) References Cited

U.S. PATENT DOCUMENTS 6,601,980 B2   8/2003   Kobayashi et al.
6,765,495 B1   7/2004   Dunning et al.
(Continued)

FOREIGN PATENT DOCUMENTS

DE          19931712 A1    1/2001
DE       102006058412 A1    6/2008
(Continued)

OTHER PUBLICATIONS

Kiske, "Automatic Labeling of Lane Marking for Autonomous Vehicles", pp. 1-5, http://web.stanford.edu/class/cs231a/prev_projects/AutomaticLabelingofLane.pdf, Aug. 19, 2016, Stanford University, Stanford, CA USA.
(Continued)

*Primary Examiner* — Lail A Kleinman
*Assistant Examiner* — Mahmoud M Kazimi
(74) *Attorney, Agent, or Firm* — Tucker Ellis LLP; Michael Hudzinski

(57) ABSTRACT

Systems and methods are provided for platoon initialization, redundant lane departure control, and redundant communication operation. A platooning initiation strategy requires continuous communication between vehicles for a more than a pre-defined duration, a demonstration of an operable brake light on the leading vehicle, and command control profile compatibility between the vehicles before allowing the vehicles to mutually platoon or to join an existing platoon. A set of computer readable labels visible to a Lane Departure System placed on a lead vehicle are used by a following vehicle when lane markings become invisible to sensors. A redundant brake lamp operable in a non-visible spectrum is provided for platooning. A specific brake lamp for use exclusively for platooning purposes may be provided.

34 Claims, 15 Drawing Sheets

(51) Int. Cl.

| | | |
|---|---|---|
| *H04N 5/225* | (2006.01) | |
| *B62D 15/02* | (2006.01) | |
| *B60Q 1/44* | (2006.01) | |
| *G05D 1/02* | (2006.01) | |
| *H04N 5/33* | (2006.01) | |
| *G05D 1/00* | (2006.01) | |
| *G08G 1/16* | (2006.01) | |
| *H04L 29/08* | (2006.01) | |

(52) U.S. Cl.
CPC ......... *G05D 1/0289* (2013.01); *G05D 1/0295* (2013.01); *G06K 9/00798* (2013.01); *G06K 9/00825* (2013.01); *H04N 5/2256* (2013.01); *H04N 5/33* (2013.01); *G05D 1/0027* (2013.01); *G08G 1/161* (2013.01); *H04L 67/12* (2013.01)

(56) References Cited

U.S. PATENT DOCUMENTS

| | | | |
|---|---|---|---|
| 8,352,111 B2* | 1/2013 | Mudalige | G08G 1/22 340/435 |
| 8,504,233 B1 | 8/2013 | Ferguson et al. | |
| 2006/0098448 A1 | 5/2006 | Coast et al. | |
| 2014/0172261 A1 | 6/2014 | Barlsen et al. | |
| 2015/0177007 A1 | 6/2015 | Su et al. | |
| 2016/0267795 A1 | 9/2016 | Miyazawa et al. | |
| 2017/0186327 A1* | 6/2017 | Uysal | G08G 1/22 |
| 2017/0344023 A1* | 11/2017 | Laubinger | G05D 1/0272 |
| 2018/0011497 A1 | 1/2018 | Schroeder et al. | |

FOREIGN PATENT DOCUMENTS

| | | |
|---|---|---|
| DE | 102009043953 A1 | 3/2011 |
| DE | 102011118675 A1 | 5/2013 |
| DE | 102014106978 A1 | 11/2015 |
| DE | 102017001656 A1 | 9/2017 |
| EP | 0561353 A1 | 9/1993 |
| EP | 2094521 B1 | 9/2010 |
| EP | 2390744 A1 | 11/2011 |
| WO | 2014145918 A1 | 9/2014 |
| WO | 2016120083 A1 | 8/2016 |
| WO | 2017174108 A1 | 10/2017 |
| WO | 20170196165 A1 | 11/2017 |

OTHER PUBLICATIONS

Cole, High Visibility Reflective Markings for Utility Commercial Delivery & Fleet Trucks / Vehicles, Oct. 4, 2002, pp. 1-5, http://stop-traffic.com/high-visibility-reflective-markings-for-commercial-delivery-fleet-t . . . Dec. 13, 2016.

Provisional opinion accompanying the partial search result from corresponding International Application No. PCT/US2018/067054, dated Apr. 26, 2019.

International Search Report and Written Opinion from correlating International Application No. PCT/US2018/067054, dated Jun. 19, 2019, 21 pages.

International Search Report for corresponding international application No. PCT/US2018/067054, dated Aug. 21, 2019, 21 pages.

* cited by examiner

INITIALIZATION AND SAFETY MAINTENANCE STRATEGY FOR PLATOONING VEHICLES

CROSS REFERENCE TO RELATED APPLICATIONS

This application is related to U.S. application Ser. No. 15/850,942, filed Dec. 21, 2017, entitled: DETERMINING AND USING BRAKING CAPABILITIES OF VEHICLES FOR PLATOONING DECELERATION OPERATIONS; U.S. application Ser. No. 15/395,160, filed Dec. 30, 2016, entitled: VARYING THE DISTANCE BETWEEN VEHICLES IN A PLATOON; U.S. application Ser. No. 15/395,219, filed Dec. 30, 2016, entitled: SELF-ORDERING OF FLEET VEHICLES IN A PLATOON; U.S. application Ser. No. 15/395,251, filed Dec. 30, 2016, entitled: DETECTION OF EXTRA-PLATOON VEHICLE INTERMEDIATE OR ADJACENT TO PLATOON MEMBER VEHICLES; and U.S. application Ser. No. 15/395,214, filed Dec. 30, 2016, entitled: "V" SHAPED AND WIDE PLATOON FORMATIONS, the contents of each of these applications being incorporated herein by reference in their entirety.

TECHNICAL FIELD

The embodiments herein relate generally to highway vehicle platoon initialization and safety maintenance management. More specifically, particular embodiments relate to commercial highway vehicle platoon initialization and safety maintenance management where it is desirable to verify various operational capabilities of two or more spaced apart vehicles before permitting or otherwise enabling them to travel cooperatively in close proximity as an organized platoon along an associated roadway in a platoon arrangement, and where it is desirable to verify the maintenance of safe operation of the platooning vehicles. Although the embodiments will be described with reference to selected particular examples such as for example vehicles traveling seriatim in the platoon, it is to be appreciated that the claimed invention is also amenable to other applications and can be equivalently extended to other embodiments and environments.

BACKGROUND

It is known that two or more vehicles moving along a roadway can cooperate as a road train or a "platoon" for mutually providing to the vehicles within the platoon various safety and efficiency benefits. A typical vehicle platoon includes a leader vehicle and one or more follower vehicles arranged serially along a single roadway lane. Larger platoons can involve many follower vehicles for providing enhanced efficiency, but ensuring the safety of to both the platooned vehicles as well as of the other non-platooning vehicles on the roadway most usually dictate the short single lane platoon incarnation.

The aerodynamic geometry of the vehicles within a platoon is a significant factor used in determining an ordering of the vehicles. As a general rule, a physically smaller vehicle following a physically larger vehicle will provide a greater benefit. Since commercial box trucks and tractors towing box trailers are in general taller and wider than most flatbed tractor trailer combinations, a maximum aerodynamic benefit and resultant fuel savings is realized by ordering vehicles classified this way such that the commercial box truck and tractors towing box trailers take the leader position(s) in the platoon, while the flatbed tractor trailer rigs take the follower position(s) in the platoon.

In addition to the above, maintaining a small distance or spacing between platooned vehicles gives greater benefit in terms of reduced energy consumption. However, holding a tight distance or spacing between platooned vehicles requires that careful attention be paid to various functional or environmental and operational characteristics and capabilities of the vehicles and other external conditions including the overall size of the platoon, weather conditions, relative braking abilities between vehicle pairs, relative acceleration abilities, relative load or cargo size and weight including required stopping distance, and the like. Special attention must also be paid to characteristics of the roadway such as roadway incline, decline, and turn radii. These various parameters implicate directly or indirectly the inter-vehicle safety considerations as well as the overall safety of multiple vehicle platoons.

In the single lane platoon incarnation described above, the vehicles participating in a platoon typically mutually cooperate to maintain a relatively fixed and constant (even or the same) distance between adjacent vehicles by exchanging deceleration command and other signals between adjacent vehicles of the platoon. On flat roadways, the even distance maintained between the vehicles is often fixed and constant in accordance with control protocols using combinations of global positioning systems (GPS) data sharing, deceleration command signal exchanges, and safety and efficiency algorithms. On graded roadways, the relatively even distance maintained between the vehicles is often modified to improve or otherwise maintain or enhance the overall safety and efficiency of the platoon. For example, the even distance maintained between the vehicles can be decreased during conditions of the platoon traversing an incline wherein the tendency of the overall platoon is to decrease speed slightly. Conversely, the even distance maintained between the vehicle can be increased during conditions of the platoon traversing a decline wherein the tendency of the overall platoon is to increase speed slightly. In any case, the relative distance between the vehicles of the platoon preferably remains substantially even, constant or the same in accordance with platoon control mechanisms and protocols in place.

For maintaining the preferred relatively fixed and constant (even or the same) distance between adjacent vehicles, many commercial vehicles that participate in platoons are highly sophisticated and are also equipped with adaptive cruise control (ACC) systems including forward and rearward sensors used for maintaining a safe relative distance between a host vehicle and a forward vehicle, and collision mitigation (CM) systems for avoiding or lessening the severity of impacts between a host and forward and rearward vehicles using various combinations of transmission, vehicle retarder, and foundation brake controls.

In addition to the above, vehicles participating in a platoon typically share their positions with other vehicles of the platoon by communicating their GPS coordinate data with other vehicles using vehicle-to-vehicle (V2V) communications ("V2V Unicast" communications), and/or vehicle-2-vehicles (V2x) communications ("V2V Multicast" communications), and/or any other suitable communications that might be available. One SAE standard is J2945 directed in general to Dedicated Short Range Communication (DSRC), and a work in process portion of that standard is J2945/6 is directed to performance requirements for cooperative adaptive cruise control and platooning. J2945/6 is intended to define the data exchange that will be necessary for coordinated platoon maneuvers, and that definition of the categories should start with differentiating between platooning and ACC, then determining message sets and performance to realize cooperative vehicles.

Currently, the technique for vehicles participating in a platoon to share their position with other vehicles of the platoon involves determining, by each vehicle, its own GPS coordinate data, broadcasting by each vehicle its own GPS coordinate data to all of the other vehicles of the platoon using over-the-air communications (such as the J2945/6 communications), and receiving the GPS position data from all of the other vehicles of the platoon. In this way, each vehicle of the platoon knows the position(s) of each other vehicle of the platoon. The GPS coordinate data is then used by each vehicle to, among other things, establish the relatively even distance coordinated between the vehicles as generally described above.

Platooning vehicles follow each other on the roadway in close proximity to each other and often at highway speeds as explained above, and for this they typically use a Radar to control the inter-vehicle distance(s). For the lateral control using automatic steering control, Lane Departure Systems track the lane markings and actively steer the vehicles between the detected lane lines and/or marks. For emergency braking situations such as Autonomous Emergency Braking (AEB) events for example, forward-directed cameras on a following vehicle detect the actuation by a forward vehicle of a rearward facing brake light so that appropriate emergency stopping or other actions can suitably be initiated.

Vehicles that operate on public roadways, however, sometimes encounter conditions that adversely affect the platoon including for example equipment failure and weather conditions. Brake lights may burn out or otherwise fails and bad weather can affect the ability of the vehicles to communicate with each other and may also affect the ability of the vehicles to communicate with remote systems such as cell towers or satellite systems. Bad weather may also impede the ability of lane marker cameras or other lane marker sensors to detect the lane lines.

Given the above, therefore, it would be helpful to provide a platooning initialization strategy to be completed between two or more vehicles while they are spaced apart by a safe distance and before they are allowed to be controlled in the platoon and placed within the mutual close proximity of the platoon. Steps of an initialization protocol should be satisfactorily completed by the vehicles before they are permitted to enter into a platooning control mode and prior to them being moved into close mutual proximity.

It would further be helpful to provide an auxiliary or redundant lamp for placement on the trailer of platooning vehicles to visually indicate to the following vehicle when an emergency stop is being demanded by the driver of the master and/or leading vehicle or if an Autonomous Emergency Braking (AEB) event is commencing on the lead vehicle.

It would be helpful to provide the auxiliary lamp as an additional brake light or lamp that would not illuminate during non-AEB events or for autonomously demanded deceleration above a predetermined level, but would selectively illuminate, however, in accordance with one or more predetermined conditions including for example: when the lead vehicle driver demands manual braking greater than a specified deceleration level, when an AEB event has commenced on the lead vehicle, or when an autonomous braking event of the lead vehicle is greater than a specified deceleration level.

It would be helpful to provide the redundant lamp as a lamp operable in a non-visible spectrum thereby providing an additional form of communication in case primary communication is not functioning properly at the time of an event.

It would also be helpful to provide an alternative mechanism for following vehicles to use as lane departure control parameters in the event of loss of an ability to sense or otherwise determine lane lines.

SUMMARY OF THE EXAMPLE EMBODIMENTS

The embodiments herein provide for new and improved systems and methods for platoon initialization and improved systems and methods for safety maintenance of platooning vehicles. In particular, the embodiments herein provide for new and improved systems and methods for platoon initialization, redundant lane departure control, and redundant communication operation.

An example embodiment includes a set of one or more prerequisite steps to be completed between two or more vehicles while they are spaced apart by a safe distance and before they are allowed to be controlled in the platoon and placed within the mutual close proximity of the platoon. The prerequisite steps of an example initialization protocol are to be satisfactorily completed by the vehicles before they are permitted to enter into a platooning control mode and prior to them being moved into close mutual proximity.

The embodiments herein provide for new and improved systems and methods for providing an auxiliary or redundant lamp for placement on the trailer of platooning vehicles. The auxiliary or redundant lamp visually indicates to the following vehicle when procedure such as an emergency stop is being demanded by the driver of the leading master and/or leading vehicle. The auxiliary or redundant lamp may also visually indicate to the following vehicle if an Autonomous Emergency Braking (AEB) event is commencing on the lead vehicle.

In accordance with another aspect, the auxiliary lamp is functional as an additional brake light or lamp that is not illuminated during non-AEB events or for autonomously demanded deceleration above a predetermined deceleration threshold level. The additional brake light or lamp is however, selectively illuminated in accordance with one or more predetermined conditions including for example when the lead vehicle driver demands manual braking greater than a specified deceleration level. The additional brake light or lamp may further be selectively illuminated when an AEB event has commenced on the leading vehicle. The additional brake light or lamp may further be selectively illuminated when an autonomous braking event of the lead vehicle is greater than a specified deceleration level.

In accordance with another aspect, the auxiliary lamp is functional or otherwise operable in a non-visible spectrum thereby providing an additional form of communication for functioning as a backup communication and/or redundant communication selectively in accordance with a malfunction or other degradation of the primary communication at the time of an event.

In accordance with a further aspect, an alternative mechanism is provided on leading vehicles to enable following vehicles to abide by lane departure parameters in the event of loss of an ability to sense or otherwise determine lane lines. In one form, the alternative mechanism is a physical label or other marking carried on the rear portion of the platooning vehicles wherein the physical label or other markings are trackable by forward vision systems for following the leading vehicle within the lane markings.

In accordance with an embodiment, a system is provided for initialization of platoon control between an associated following vehicle and a set of at least one other associated vehicle comprising an associated leading vehicle travelling forward of the associated following vehicle to cooperatively travel as a platoon along an associated roadway. The system of the example embodiment includes a platoon control unit in operative communication with an associated electronic control unit of the associated following vehicle. The system of the example embodiment further includes a communication receiver operatively coupled with the platoon control unit, a communication transmitter operatively coupled with the platoon control unit, a timer operatively coupled with the platoon control unit; and a sensor unit operatively coupled with the platoon control unit. In accordance with the example embodiment, the platoon control unit comprises a processor, a memory device operatively coupled with the processor, and logic stored in the memory and executable by the processor to initialize the platoon control of the associated following vehicle.

The communication receiver of the example embodiment is operable to receive, at a first time, a first communication signal from the associated leading vehicle, the first communication signal comprising first communication data selectively usable by the associated following vehicle to selectively effect the initialization of the platoon control.

The communication receiver of the example embodiment is further operable to receive, at a second time, a second communication signal from the associated leading vehicle, the second communication signal comprising second communication data selectively usable by the associated following vehicle to selectively effect the initialization of the platoon control.

The communication receiver of the example embodiment is operable to receive, from the associated leading vehicle, a control profile request signal comprising control profile request data usable by the platoon control unit of the associated following vehicle to selectively communicate the control profile request data to the associated electronic control unit of the associated following vehicle for operating the associated following vehicle by the associated electronic control unit of the associated following vehicle according to the control profile request data.

The communication transmitter of the example embodiment is operable to receive, from the platoon control unit, first functional request command data, convert the first functional request command data into a first functional request command signal, and transmit the first functional request command signal from the associated following vehicle to the associated leading vehicle.

The timer of the example embodiment is operable to determine a time interval between the first time and the second time, and generate time interval data representative of the determined time interval between the first time and the second time.

The sensor unit of the example embodiment is operable to sense execution of an affirmative function by the associated leading vehicle responsive to the first functional request command signal, and selectively generate affirmative function detected data representative of an execution of the affirmative function by the associated leading vehicle being sensed by the sensor unit.

In accordance with the example embodiment, the logic of the platoon control unit is executable by the processor to compare the time interval data with predetermined maximum idle data stored in the memory device of the platoon control unit, the predetermined maximum idle data being representative of a time extent for concluding a first communication link between the following vehicle and the associated leading vehicle is inoperable and/or inactive and/or has failed.

Further in accordance with the example embodiment, the logic of the platoon control unit is executable by the processor to selectively generate communication persistency data responsive to the time interval data being less than the maximum idle data, the communication persistency data being representative of the first communication link between the following and leading vehicles being operable and/or active and/or having not failed.

Further in accordance with the example embodiment, the logic of the platoon control unit is executable by the processor to determine a correspondence between the first functional request command data and the affirmative function detected data, and selectively generate functional handshake data responsive to determining the correspondence between the first functional request command data and the affirmative function detected data.

Further in accordance with the example embodiment, the logic of the platoon control unit is executable by the processor to compare the control profile request data with predetermined maximum control profile capabilities data stored in the memory device of the platoon control unit, the predetermined maximum control profile capabilities data being representative of a set of one or more maximum operational performance capabilities of the associated following vehicle.

In accordance with an example embodiment, the logic of the platoon control unit is executable by the processor to selectively generate platoon initialization data for the initialization of the platoon control between the associated following vehicle and the set of at least one other associated vehicle comprising the associated leading vehicle responsive to the communication persistency data being selectively generated.

In accordance with a further example embodiment, the logic of the platoon control unit is executable by the processor to selectively generate platoon initialization data responsive to the functional handshake data being selectively generated.

In accordance with a further example embodiment, the logic of the platoon control unit is executable by the processor to selectively generate platoon initialization data responsive to the communication persistency data being selectively generated, and the functional handshake data being selectively generated.

In accordance with a further example embodiment, the logic of the platoon control unit is executable by the processor to selectively generate platoon initialization data responsive to a first result of the comparison between the control profile request data and the predetermined maximum control profile capabilities data stored in the memory device of the platoon control unit. In an embodiment, the first result is the control profile request data being determined to be within predetermined bounds of the predetermined maximum control profile capabilities data stored in the memory device of the platoon control unit.

In accordance with a further example embodiment, the logic of the platoon control unit is executable by the processor to selectively generate platoon initialization data responsive to the communication persistency data being selectively generated, and a first result of the comparison between the control profile request data and the predetermined maximum control profile capabilities data stored in the memory device of the platoon control unit. In an embodiment, the first result is the control profile request data being determined to be within predetermined bounds of the predetermined maximum control profile capabilities data stored in the memory device of the platoon control unit.

In accordance with a further example embodiment, the logic of the platoon control unit is executable by the processor to selectively generate platoon initialization data responsive to the functional handshake data being selectively generated, and a first result of the comparison between the control profile request data and the predetermined maximum control profile capabilities data stored in the memory device of the platoon control unit. In an embodiment, the first result is the control profile request data being determined to be within predetermined bounds of the predetermined maximum control profile capabilities data stored in the memory device of the platoon control unit.

In accordance with a further example embodiment, the logic of the platoon control unit is executable by the processor to selectively generate platoon initialization data responsive to the communication persistency data being selectively generated, the functional handshake data being selectively generated, and a first result of the comparison between the control profile request data and the predetermined maximum control profile capabilities data stored in the memory device of the platoon control unit. In an embodiment, the first result is the control profile request data being determined to be within predetermined bounds of the predetermined maximum control profile capabilities data stored in the memory device of the platoon control unit.

In accordance with a further example embodiment a method is provided for initialization of platoon control between an associated following vehicle and a set of at least one other associated vehicle comprising an associated leading vehicle travelling forward of the associated following vehicle to cooperatively travel as a platoon along an associated roadway.

The method includes providing a platoon control unit in operative communication with an associated electronic control unit of the associated following vehicle, the platoon control unit comprising a processor, a memory device operatively coupled with the processor, and logic stored in the memory and executable by the processor to initialize the platoon control of the associated following vehicle.

The method further includes receiving from the associated leading vehicle at a first time by a communication receiver operatively coupled with the platoon control unit, a first communication signal comprising first communication data selectively usable by the associated following vehicle to selectively effect the initialization of the platoon control.

The method further includes receiving from the associated leading vehicle at a second time by the communication receiver operatively coupled with the platoon control unit, a second communication signal comprising second communication data selectively usable by the associated following vehicle to selectively effect the initialization of the platoon control.

The method further includes receiving by the communication transmitter from the platoon control unit, first functional request command data, converting by the communication transmitter the first functional request command data into a first functional request command signal, and transmitting by the communication transmitter the first functional request command signal from the associated following vehicle to the associated leading vehicle.

The method further includes determining by a timer operatively coupled with the platoon control unit, a time interval between the first time and the second time, and generating by the timer time interval data representative of the determined time interval between the first time and the second time.

The method further includes sensing by a sensor unit operatively coupled with the platoon control unit execution of an affirmative function by the associated leading vehicle responsive to the first functional request command signal.

The method further includes selectively generating by the sensor unit affirmative function detected data representative of an execution of the affirmative function by the associated leading vehicle being sensed by the sensor unit.

The method further includes comparing, by executing the logic of the platoon control unit by the processor, the time interval data with predetermined maximum idle data stored in the memory device of the platoon control unit, the predetermined maximum idle data being representative of a time extent for concluding a first communication link between the following vehicle and the associated leading vehicle is inoperable and/or inactive and/or has failed.

The method further includes selectively generating, by executing the logic of the platoon control unit, communication persistency data responsive to the time interval data being less than the maximum idle data, the communication persistency data being representative of the first communication link between the following and leading vehicles being operable and/or active and/or having not failed.

The method further includes determining, by executing the logic of the platoon control unit by the processor, a correspondence between the first functional request command data and the affirmative function detected data, and selectively generating functional handshake data responsive to determining the correspondence between the first functional request command data and the affirmative function detected data.

The method further includes receiving by the communication receiver from the associated leading vehicle, a control profile request signal comprising control profile request data usable by the platoon control unit of the associated following vehicle to selectively communicate the control profile request data to the associated electronic control unit of the associated following vehicle for operating the associated following vehicle by the associated electronic control unit of the associated following vehicle according to the control profile request data.

The method further includes comparing, by executing the logic of the platoon control unit by the processor, the control profile request data with predetermined maximum control profile capabilities data stored in the memory device of the platoon control unit, the predetermined maximum control profile capabilities data being representative of a set of one or more maximum operational performance capabilities of the associated following vehicle.

In an example embodiment, a further method step includes selectively generating, by executing the logic of the platoon control unit by the processor, the platoon initialization data responsive to the communication persistency data being selectively generated.

In an example embodiment, a further method step includes selectively generating, by executing the logic of the platoon control unit by the processor, the platoon initialization data responsive to the functional handshake data being selectively generated.

In a further example embodiment, a further method step includes selectively generating, by executing the logic of the platoon control unit by the processor, the platoon initialization data responsive to the communication persistency data being selectively generated, and the functional handshake data being selectively generated.

In a further example embodiment, a further method step includes selectively generating, by executing the logic of the platoon control unit by the processor, the platoon initialization data responsive to a first result of the comparison between the control profile request data and the predetermined maximum control profile capabilities data stored in the memory device of the platoon control unit. In an embodiment, the first result is the control profile request data being determined to be within predetermined bounds of the predetermined maximum control profile capabilities data stored in the memory device of the platoon control unit.

In a further example embodiment, a further method step includes selectively generating, by executing the logic of the platoon control unit by the processor, the platoon initialization data responsive to a first result of the comparison between the control profile request data and the predetermined maximum control profile capabilities data stored in the memory device of the platoon control unit, and the communication persistency data being selectively generated. In an embodiment, the first result is the control profile request data being determined to be within predetermined bounds of the predetermined maximum control profile capabilities data stored in the memory device of the platoon control unit.

In a further example embodiment, a further method step includes selectively generating, by executing the logic of the platoon control unit by the processor, the platoon initialization data responsive to a first result of the comparison between the control profile request data and the predetermined maximum control profile capabilities data stored in the memory device of the platoon control unit, and the functional handshake data being selectively generated. In an embodiment, the first result is the control profile request data being determined to be within predetermined bounds of the predetermined maximum control profile capabilities data stored in the memory device of the platoon control unit.

In a further example embodiment, a further method step includes selectively generating, by executing the logic of the platoon control unit by the processor, the platoon initialization data responsive to a first result of the comparison between the control profile request data and the predetermined maximum control profile capabilities data stored in the memory device of the platoon control unit, the communication persistency data being selectively generated, and the functional handshake data being selectively generated. In an embodiment, the first result is the control profile request data being determined to be within predetermined bounds of the predetermined maximum control profile capabilities data stored in the memory device of the platoon control unit.

Other embodiments, features and advantages of the example embodiments for platoon initialization, redundant lane departure control, and redundant communication operation will become apparent from the following description of the embodiments, taken together with the accompanying drawings, which illustrate, by way of example, the principles of the example embodiments.

BRIEF DESCRIPTION OF THE DRAWINGS

In the accompanying drawings which are incorporated in and constitute a part of the specification, embodiments of the invention are illustrated, which, together with a general description of the invention given above, and the detailed description given below, serve to exemplify the embodiments of this invention.

DETAILED DESCRIPTION OF THE EXAMPLE EMBODIMENTS

In the following description of the present invention reference is made to the accompanying figures which form a part thereof, and in which is shown, by way of illustration, exemplary embodiments illustrating the principles of the present invention and how it is practiced. Other embodiments can be utilized to practice the present invention and structural and functional changes can be made thereto without departing from the scope of the present invention.

Figure 1:
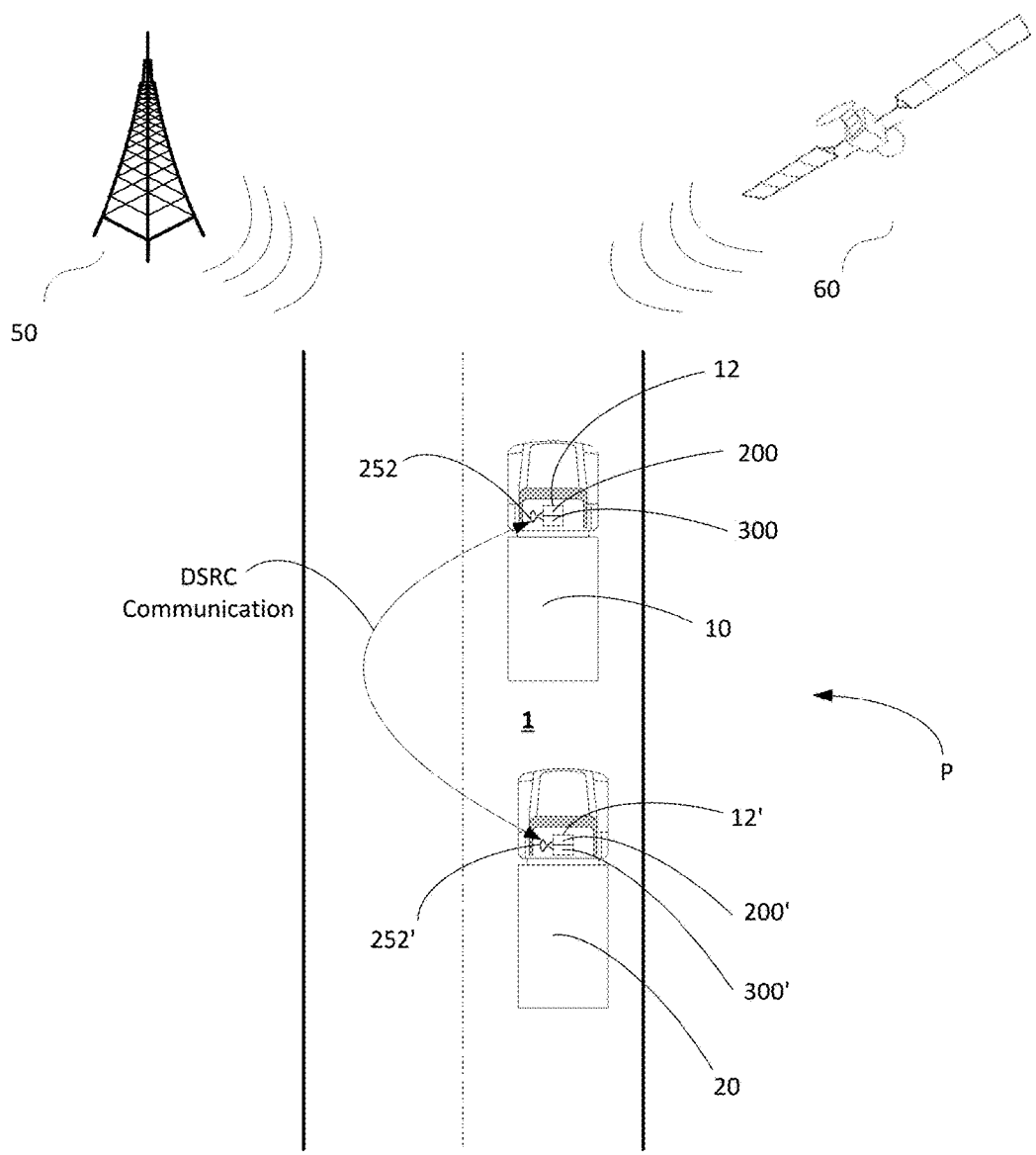
FIG. 1 is a schematic depiction of operation of an exemplary platoon in accordance with the embodiments.

Referring now to the drawings, wherein the showings are for the purpose of illustrating the example embodiments for platoon initialization, redundant lane departure control, and redundant communication operation only, and not for purposes of limiting the same, FIG. 1 illustrates a basic platoon P including a host or leader vehicle 10 in traffic with a second or follower vehicle 20 in accordance with the present disclosure. As shown, the follower vehicle 20 is traveling proximate to the leader vehicle 10 in an ordered platoon P along a roadway 1. In the example embodiment shown, the follower vehicle 20 is traveling proximate to the leader vehicle 10 seriatim along the roadway 1 in the example platoon P. However, it is to be appreciated that the platoon P can take on any arrangement of vehicle conformation in accordance with further embodiments. The leader vehicle 10 is provided with an electronic control system 12 which includes a data collection and communication module portion 200 (FIG. 2) and a platooning control portion 300 (FIG. 3) to be described in greater detail below. Similarly, the follower vehicle 20 is also provided with an electronic control system 12' which includes a data collection and communication module portion 200' similar to the data collection and communication module portion 200 of the leader vehicle 10, and a platooning control portion 300' similar to the platooning control portion 300 of the leader vehicle 10. In the example embodiments to be described herein, each of the two or more vehicles comprising the various platoons that will be described include the same or equivalent electronic control system 12, the same or equivalent data collection and communication module portion 200, and the same or equivalent platooning control portion 300. However, it is to be appreciated that other control systems having the functionality to be described herein may equivalently be used as necessary or desired.

In the example embodiment illustrated, the electronic control systems 12, 12' of the respective vehicles 10, 20 are configured for mutually communicating signals and exchanging data between each other, and also for communicating signals and exchanging data with various other communication systems including for example a remote wireless communication system 50 and a remote satellite system 60. These remote systems 50, 60 can provide, for example, global position system (GPS) data to the vehicles 10, 20 as desired. Other information may be provided or exchanged between the vehicles and the remote systems as well such as, for example, fleet management and control data from a remote fleet management facility, or the like (not shown). Although this functionality is provided, the embodiments herein find this remote communication, though useful, not necessarily essential wherein the embodiments herein are directed to inter-vehicle platoon distance and/or spacing management i.e. platoon ordering and spacing beneficially without the need to consult with or act under the direction of or in concert with the remote wireless communication system 50, the remote satellite system 60, the remote fleet management facility, a Network Operations Center (NOC), a Central Command Center (CCC), or the like.

In addition to the above, the electronic control systems 12, 12' of each vehicle 10, 20 operates to perform various vehicle-to-(single)vehicle (V2V Unicast) communication (communication between a broadcasting vehicle and a single responding vehicle), as well as various vehicle-to-(multiple) vehicle (V2V Broadcast) communication (communication between a broadcasting vehicle and two or more responding vehicles), and further as well as various vehicle-to-infrastructure (V2I) communication. Preferably, the local V2V Unicast and V2V Broadcast communication follows the J2945 DSRC communications specification. In this regard, the vehicles forming the basic platoon P can communicate with each other locally for self-ordering and spacing into a platoon without the need for input from the NOC in accordance with the embodiments herein. The vehicles forming the basic platoon P can also communicate with one or more other vehicles locally without the need for input from the NOC for negotiating the one or more other vehicles into the platoon in accordance with the embodiments herein. The vehicles forming the basic platoon P can further communicate with a fleet management facility remotely as may be necessary and/or desired for ordering into a platoon in accordance with further example embodiments herein.

As noted above, preferably, the local V2V Unicast and V2V Broadcast communication between vehicles as will be described herein follows the J2945 DSRC communications specification. This specification at present, does not define one-to-one vehicle communications. Rather, operationally, each communication-capable vehicle sends the needed information by a broadcast to every other communication-capable vehicle within range, and the receiving vehicle(s) decide if they want to process the received message. For example only vehicles who are platoon capable and the driver has indicated, via a switch or user interface, that joining a platoon is desired, that vehicle will start broadcasting and listening for the Platoon protocol messages. All other vehicles in the area will receive and ignore the platoon information. Accordingly, as will be used herein and for purposes of describing the example embodiments, "V2V Unicast" communication will refer to communication between a broadcasting vehicle and a single responding vehicle, and "V2V Broadcast communication" will refer to communication between a broadcasting vehicle and two or more responding vehicles. It is to be appreciated that "V2V Unicast" communication also refers to one-to-one direct vehicle communications as the J2945 DSRC communications specification is further developed or by use of any one or more other standards, specifications, or technologies now known or hereinafter developed.

Figure 2:
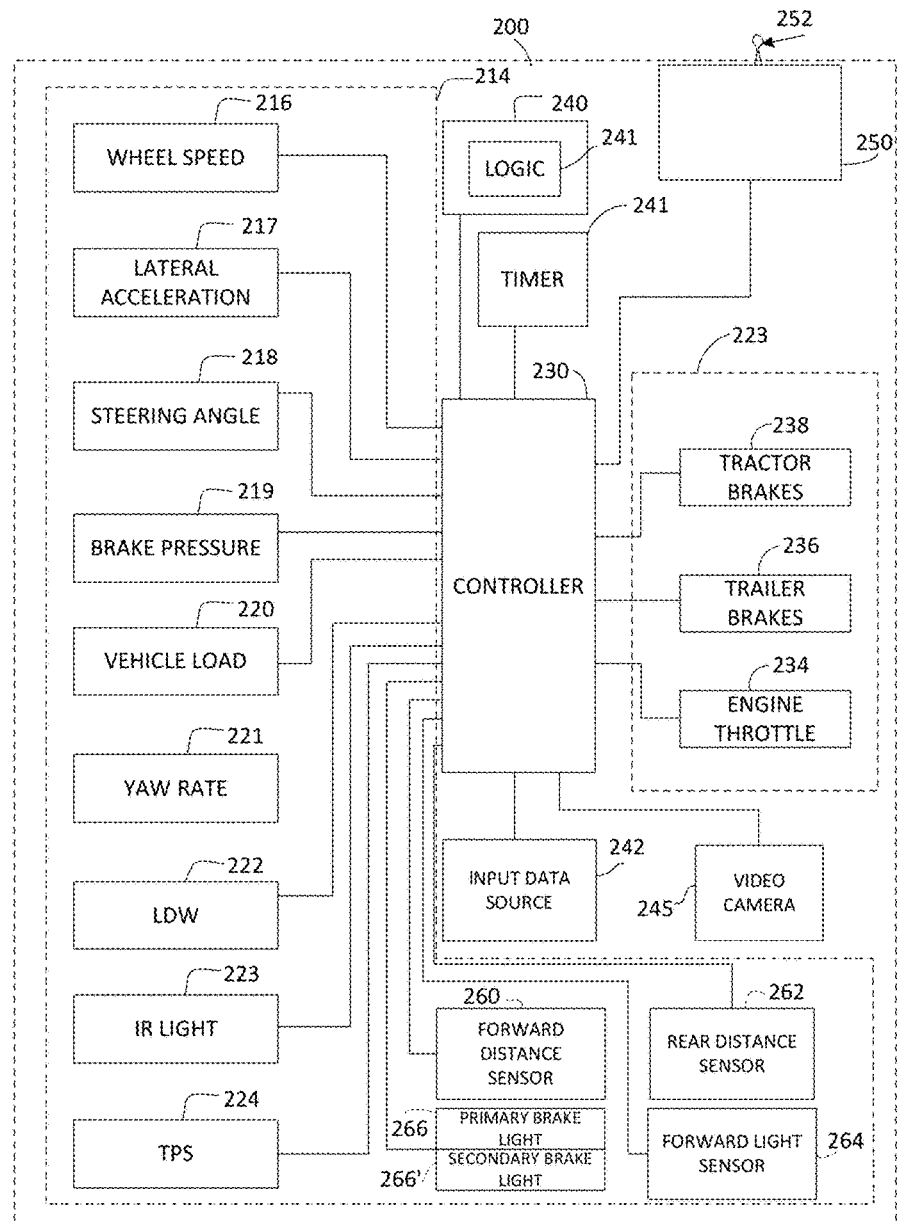
FIG. 2 is a schematic illustration of an exemplary embodiment of a data collection and communication module portion of the subject multi-lane platoon control system for platoon initialization, redundant lane departure control, and redundant communication operation according to the example embodiment.

With reference next to FIG. 2, a schematic representation of a data collection and communication module portion 200 of the subject system for new and improved systems and methods for platoon initialization for rearrangement of vehicles into regular, such as columnar for example, formations, for redundant lane departure control, and for redundant communication operation according to principles of the example embodiment is illustrated. Other vehicle arrangements for platooning are possible according to principles of the example embodiments including for example non-columnar formation, V-shaped formations, and others for example. The data collection and communication module 200 may be adapted to detect, monitor, and report a variety of operational parameters and conditions of the commercial vehicle and the driver's interaction therewith, and to selectively intervene and take corrective action as may be needed or desired such as, for example, to maintain vehicle stability or to maintain the vehicle following distance relative to other vehicles within a platoon. In the exemplary embodiment of FIG. 2, the data collection and communication module 200 may include one or more devices or systems 214 for providing input data indicative of one or more operating parameters or one or more conditions of a commercial vehicle. For example, the devices 214 may be one or more sensors, such as but not limited to, one or more wheel speed sensors 216, a lateral acceleration sensor 217, a steering angle sensor 218, a brake pressure sensor 219, a vehicle load sensor 220, a yaw rate sensor 221, a lane departure warning (LDW) sensor or system 222, and a tire pressure (TPMS) monitoring system 224. The data collection and communication module 200 may also utilize additional devices or sensors in the exemplary embodiment including for example a forward distance sensor 260, a rear distance sensor 262, one or more rear lights such as a primary rear brake light 266 and a secondary rear brake light 266', a forward light sensor 264, and an Infrared (IR) light 223. Other sensors and/or actuators or energy generation devices or combinations thereof may be used of otherwise provided as well, and one or more devices and/or sensors may be combined into a single unit as may be necessary and/or desired.

The data collection and communication module 200 may also include a logic applying arrangement 230, such as a controller or processor, in communication with the one or more devices or systems 214. The controller 230 may include one or more inputs for receiving input data from the devices or systems 214. The controller 230 may be adapted to process the input data and compare the raw or processed input data to a stored threshold value and/or to one or more others signal and/or data. The controller 230 may also include one or more outputs for delivering a control signal to one or more vehicle systems 232 based on the comparison. The control signal may instruct the systems 232 to intervene in the operation of the vehicle to initiate corrective action, and then report this corrective action to a wireless service (not shown) or simply store the data locally to be used for determining a driver quality. For example, the controller 230 may generate and send the control signal to an engine electronic control unit or an actuating device to reduce the engine throttle 234 and slowing the vehicle down. Further, the controller 230 may send the control signal to a vehicle brake system to selectively engage the brakes. The controller 230 may send the control signal to selectively activate the primary and or secondary brake lights 266, 266' for reasons to be described below including for example to communicate information to following vehicles as may be deemed necessary or desired. In a tractor-trailer arrangement, the controller 230 may engage the brakes on one or more wheels of a trailer portion of the vehicle 236 and the brakes on one or more wheels of a tractor portion of the vehicle 238, and then report this corrective action to the wireless service or simply store the data locally to be used for determining a driver quality. A variety of corrective actions may be possible and multiple corrective actions may be initiated at the same time.

The controller 230 may also include a memory portion 240 for storing and accessing system information, such as for example the system control logic and control tuning. The memory portion 240, however, may be separate from the controller 230. The sensors 214 and controller 230 may be part of a preexisting system or use components of a preexisting system. For example, the Bendix® ABS-6™ Advanced Antilock Brake Controller with ESP® Stability System available from Bendix Commercial Vehicle Systems LLC may be installed on the vehicle. The Bendix® ESP® system may utilize some or all of the sensors described in FIG. 2. The logic component of the Bendix® ESP® system resides on the vehicle's antilock brake system electronic control unit, which may be used for the controller 230 of the present invention. Therefore, many of the components to support the data collection and communication module 200 of the present invention may be present in a vehicle equipped with the Bendix® ESP® system, thus, not requiring the installation of additional components. The data collection and communication module 200, however, may utilize independently installed components if desired.

The controller 230 may also include a timer portion 241 operable to time stamp one or more events and/or determine one or more timer intervals between selected one or more events. In the example embodiment, the timer is operable to determine a time interval a time interval (INT) between a first time (T1) and a second time (T2), and generate time interval data (INT_data) representative of the determined time interval (INT).

The data collection and communication module 200 may also include a source of input data 242 for receiving data indicative of a configuration/condition of a commercial vehicle, data indicative of environmental conditions around the vehicle, or the like. The controller 230 may sense or estimate the configuration/condition and/or the environmental conditions around the vehicle based on the input data, and may select a control tuning mode or sensitivity based on the vehicle configuration/condition. The controller 230 may compare the operational data received from the sensors or systems 214 to the information provided by the tuning. The tuning of the system may include, but not be limited to: the nominal center of gravity height of the vehicle, look-up maps for lateral acceleration level for rollover intervention, look-up maps for yaw rate differential from expected yaw rate for yaw control interventions, steering wheel angle allowance, tire variation allowance, and brake pressure rates, magnitudes and maximums to be applied during corrective action.

A vehicle configuration/condition may refer to a set of characteristics of the vehicle which may influence the vehicle's stability (roll and/or yaw). For example, in a vehicle with a towed portion, the source of input data 242 may communicate the type of towed portion. In tractor-trailer arrangements, the type of trailer being towed by the tractor may influence the vehicle stability. This is evident, for example, when multiple trailer combinations (doubles and triples) are towed. Vehicles with multiple trailer combinations may exhibit an exaggerated response of the rearward units when maneuvering (i.e. rearward amplification). To compensate for rearward amplification, the data collection and communication module 200 may select a tuning that makes the system more sensitive (i.e. intervene earlier than would occur for a single trailer condition). The control tuning may be, for example, specifically defined to optimize the performance of the data collection and communication module for a particular type of trailer being hauled by a particular type of tractor. Thus, the control tuning may be different for the same tractor hauling a single trailer, a double trailer combination, or a triple trailer combination.

The type of load the commercial vehicle is carrying and the location of the center of gravity of the load may also influence vehicle stability. For example, moving loads such as liquid tankers with partially filled compartments and livestock may potentially affect the turning and rollover performance of the vehicle. Thus, a more sensitive control tuning mode may be selected to account for a moving load. Furthermore, a separate control tuning mode may be selectable when the vehicle is transferring a load whose center of gravity is particularly low or particularly high, such as for example with certain types of big machinery or low flat steel bars.

In addition, the controller 230 is operatively coupled with one or more video image capture devices shown in the example embodiment as a single video camera 245 representation of one or more physical video cameras disposed on the vehicle such as, for example, one video camera on each corner of the vehicle.

Still yet further, the data collection and communication module 210 may also include a transmitter/receiver (transceiver) module 250 such as, for example, a radio frequency (RF) transmitter including one or more antennas 252 for wireless communication of GPS data, one or more various vehicle configuration and/or condition data, or the like between the vehicles and one or more destinations such as, for example, to one or more wireless services 50, 60 (FIG. 1) having a corresponding receiver and antenna. The transmitter/receiver (transceiver) module 250 may include various functional parts of sub portions operatively coupled with the platoon control unit including for example a communication receiver portion, a global position sensor (GPS) receiver portion, and a communication transmitter. For communication of specific information and/or data, the communication receiver and transmitter portions may include one or more functional and/or operational communication interface portions as well.

The controller 230 is operative to communicate the acquired data to the one or more receivers in a raw data form, that is without processing the data, in a processed form such as in a compressed form, in an encrypted form or both as may be necessary or desired. In this regard, the controller 230 may combine selected ones of the vehicle parameter data values into processed data representative of higher level vehicle condition data such as, for example, data from the lateral acceleration sensor 217 may be combined with the data from the steering angle sensor 218 to determine excessive curve speed event data. Other hybrid event data relatable to the vehicle and driver of the vehicle and obtainable from combining one or more selected raw data items form the sensors includes, for example and without limitation, excessive braking event data, excessive curve speed event data, lane departure warning event data, excessive lane departure event data, lane change without turn signal event data, loss of video tracking event data, LDW system disabled event data, distance alert event data, forward collision warning event data, haptic warning event data, collision mitigation braking event data, ATC event data, ESC event data, RSC event data, ABS event data, TPMS event data, engine system event data, average following distance event data, average fuel consumption event data, and average ACC usage event data.

Figure 3:
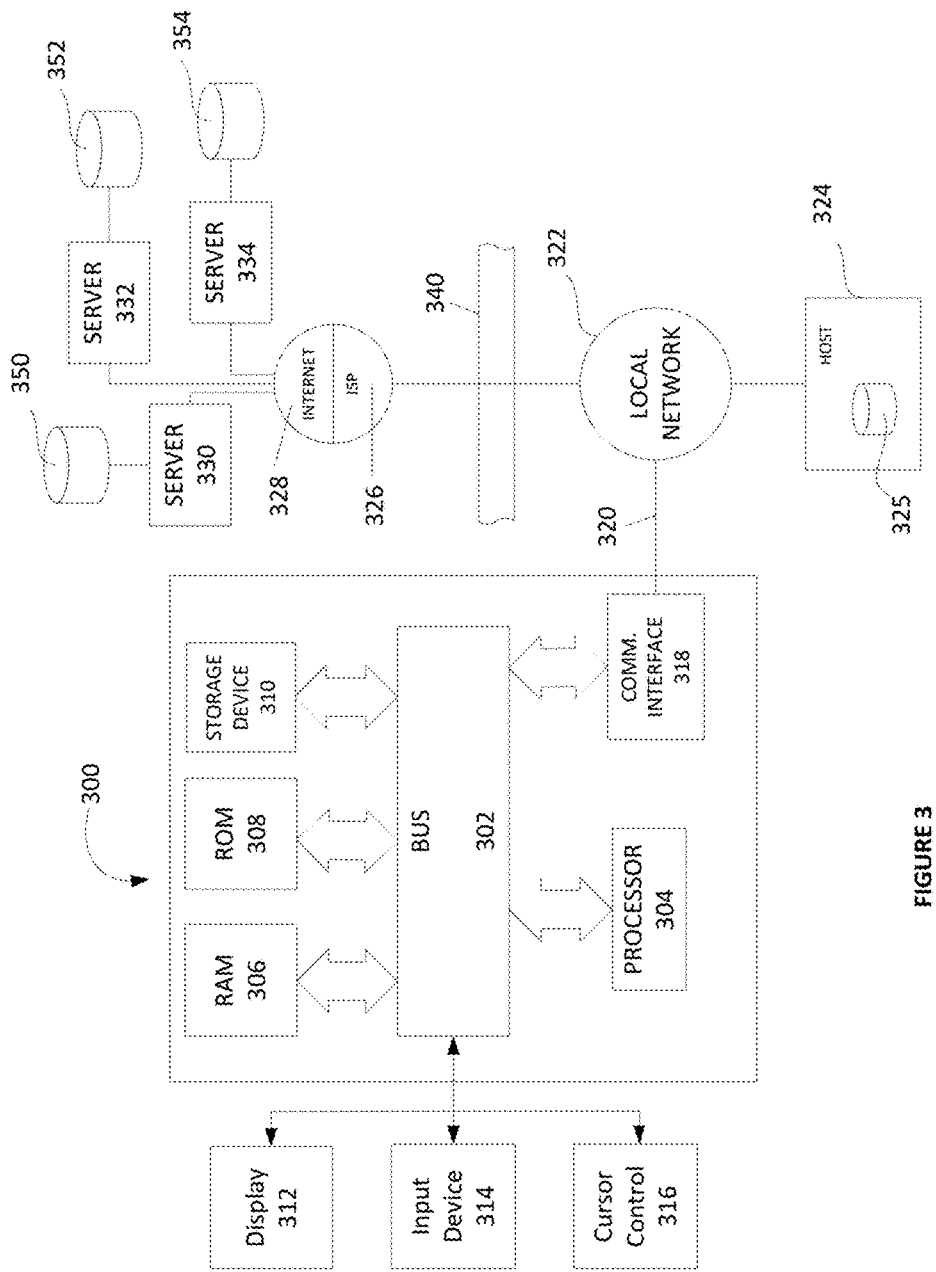
FIG. 3 is a block diagram that illustrates an exemplary embodiment of a computer system suitable for executing embodiments of one or more software systems or modules that perform control management and methods of multi-lane platoon management and control for platoon initialization, redundant lane departure control, and redundant communication operation according to the example embodiment.

FIG. 3 is a block diagram that illustrates a platoon control computer system 300 suitable for executing embodiments of one or more software systems or modules that perform platoon initialization, redundant lane departure control, redundant communication operation, and fleet management and control according to the subject application. The controller 230 of FIG. 2 may be in an example embodiment provided as the computer system 300 illustrated, for example. The example system 300 of the embodiment includes a bus 302 or other communication mechanism for communicating information, and a processor 304 coupled with the bus for processing information. The computer system includes a main memory, such as random access memory (RAM) 306 or other dynamic storage device for storing information and instructions to be executed by the processor 304, and read only memory (ROM) 308 or other static storage device for storing static information and instructions for the processor 304. A storage device 310 is also suitably provided for storing information and instructions.

The example embodiments described herein are related to the use of the computer system 300 for accessing, aggregating, manipulating and displaying information from multiple remote resources such as, for example, indirectly from multiple fleet vehicles 10, 20 and directly from multiple wireless services 50, 60. Further, the embodiments described herein are related to the use of computer system 300 for accessing information from the multiple sources in selective combination with internal proprietary data such as driver sensitive data, sales, costs, expense records, travel data, and the like from within a firewall 340. According to one implementation, information from the multiple remote public, commercial, and/or internal proprietary resources is provided by computer system 300 in response to the processor 304 executing one or more sequences of one or more instructions contained in main memory 306. Such instructions may be read into main memory 306 from another computer-readable medium, such as storage device 310. Execution of the sequences of instructions contained in main memory 306 causes the processor 304 to perform the process steps described herein. In an alternative implementation, hard-wired circuitry may be used in place of or in combination with software instructions to implement the invention. Thus implementations of the example embodiments are not limited to any specific combination of hardware circuitry and software.

In accordance with the descriptions herein, the term "computer-readable medium" as used herein refers to any non-transitory media that participates in providing instructions to the processor 304 for execution. Such a non-transitory medium may take many forms, including but not limited to volatile and non-volatile media. Non-volatile media includes, for example, optical or magnetic disks. Volatile media includes dynamic memory for example and does not include transitory signals, carrier waves, or the like. Common forms of computer-readable media include, for example, a floppy disk, a flexible disk, hard disk, magnetic tape, or any other magnetic medium, a CD-ROM, any other optical medium, punch cards, papertape, any other physical medium with patterns of holes, a RAM, PROM, and EPROM, a FLASH-EPROM, any other memory chip or cartridge, or any other tangible non-transitory medium from which a computer can read.

In addition and further in accordance with the descriptions herein, the term "logic", as used herein with respect to the Figures, includes hardware, firmware, software in execution on a machine, and/or combinations of each to perform a function(s) or an action(s), and/or to cause a function or action from another logic, method, and/or system. Logic may include a software controlled microprocessor, a discrete logic (e.g., ASIC), an analog circuit, a digital circuit, a programmed logic device, a memory device containing instructions, and so on. Logic may include one or more gates, combinations of gates, or other circuit components.

The platoon initialization, redundant lane departure control, and redundant communication computer system 300 includes a communication interface 318 coupled to the bus 302 which provides a two-way data communication coupling to a network link 320 that is connected to local network 322. For example, communication interface 318 may be an integrated services digital network (ISDN) card or a modem to provide a data communication connection to a corresponding type of telephone line. As another example, communication interface 318 may be a local area network (LAN) card to provide a data communication connection to a compatible LAN. Wireless links may also be implemented. In any such implementation, communication interface 318 sends and receives electrical, electromagnetic or optical signals that carry digital data streams representing various types of information.

Network link 320 typically provides data communication through one or more networks to other data devices. For example, network link 320 may provide a connection through local network 322 to a host computer 324 supporting a database 325 storing internal proprietary data and/or to data equipment operated by an Internet Service Provider (ISP) 326. ISP 326 in turn provides data communication services through the Internet 328. Local network 322 and Internet 328 both use electric, electromagnetic or optical signals that carry digital data streams. The signals through the various networks and the signals on network link 320 and through communication interface 318, which carry the digital data to and from the platoon self-ordering computer system 300, are exemplary forms of carrier waves transporting the information.

The platoon initialization, redundant lane departure control, and redundant communication computer system 300 can send messages and receive data, including program code, through the network(s), network link 320 and communication interface 318. In the Internet-connected example embodiment, the platoon initialization, redundant lane departure control, and redundant communication computer system 300 is operatively connected with a plurality of external public, private, governmental or commercial servers (not shown) as one or more wireless services 50, 60 configured to execute a web application in accordance with the example embodiment to be described below in greater detail. In the example embodiment shown, the first server 330 is coupled with a database 350 storing selected data received by a first wireless service such as for example data from a first telematics supplier, the second first server 332 is coupled with a database 352 storing selected data received by a second wireless service such as for example data from a second telematics supplier, and the third server 334 is coupled with a database 354 storing selected proprietary data and executable code for performing the web application. The platoon initialization, redundant lane departure control, and redundant communication computer system 300 is operative to selectively transmit a request for data to be selectively retrieved from the respective databases 350, 352, 354 through Internet 328, ISP 326, local network 322 and communication interface 318 or to receive selected data pushed from the databases 350, 352, 354, or by both means in accordance with the example embodiments. The received data is processed executed by the processor 304 as it is received, and/or stored in storage device 310, or other non-volatile storage for later processing or data manipulation.

Although the platoon initialization, redundant lane departure control, and redundant communication computer system 300 is shown in FIG. 3 as being connectable to a set of three (3) servers, 330, 332, and 334, those skilled in the art will recognize that the platoon initialization, redundant lane departure control, and redundant communication computer system 300 may establish connections to multiple additional servers on Internet 328. Each such server in the example embodiments includes HTTP-based Internet applications, which may provide information to platoon rearrangement computer system 300 upon request in a manner consistent with the present embodiments.

Selectively locating the proprietary commercial data in database 325 within the firewall 340 is advantageous for numerous reasons including enabling rapid comprehensive local queries without substantial network overhead. However, it is important to maintain the accuracy of the data by performing update or refresh operations on a schedule based on the characteristics of the desired data or on the data requirements of a particular query.

The platoon initialization, redundant lane departure control, and redundant communication computer system 300 suitably includes several subsystems or modules to perform the platoon control and management as set forth herein. A primary purpose of the subject application is to provide platoon control and management for platoon initialization for arranging two or more vehicles cooperatively travelling as a platoon along an associated roadway into a platoon arrangement, to provide redundant lane departure control for the two or more vehicles cooperatively travelling as the platoon along the associated roadway in the platoon arrangement, and to provide for redundant communication between the two or more vehicles in the platoon.

Figure 4:
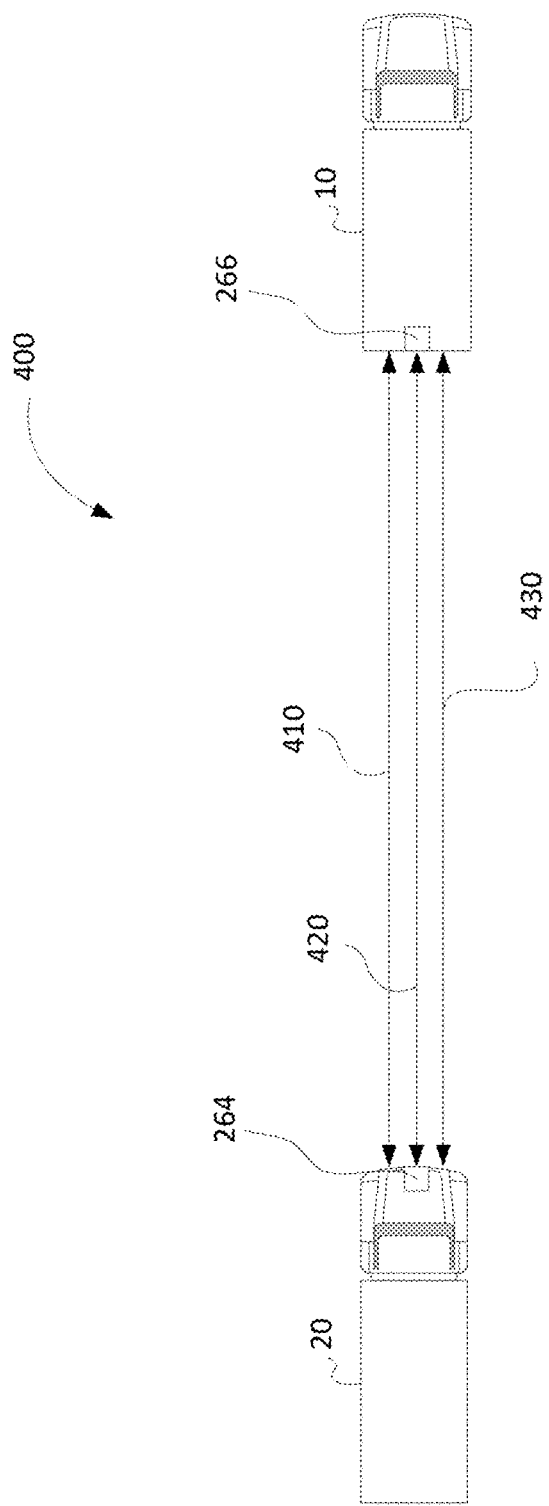
FIG. 4 is a schematic depiction of a set of signals used by a pair of spaced apart vehicles for initialization prior to forming a platoon in accordance with an embodiment.

FIG. 4 is a schematic depiction of a set of signals used by a pair of spaced apart vehicles 10, 20 for initialization prior to forming a platoon P (FIG. 1) in accordance with an embodiment. Since vehicle platooning places two vehicles within close proximity to each other often travelling at highway speeds, it is important to implement and require full completion of a rigorous platooning initiation strategy between the two vehicles before they are allowed to be controlled and placed within close proximity. In this regard, the vehicles 10, 20 illustrated in FIG. 4 are disposed in a spaced apart pre-platoon relationship 400 and, accordingly, are not engaged in any active platooning control functions. In this regard the vehicles are preferably separated by a safe distance in terms of their respective operational characteristics and relative to their speeds, braking capabilities, and other operational and environmental considerations.

In accordance with an example embodiment, the platoon initialization strategy to be described in greater detail below requires completion one or more of a set of three (3) verification criteria prior to permitting or otherwise enabling platooning control or other operations. The set of three (3) verifications are shown schematically in the Figure and include a first verification criteria 410 that requires verification of continuous communication between vehicles for a more than a pre-defined duration for successful completion of the initiation strategy.

In the second verification criteria 420, execution of an affirmative function by the leading vehicle 10 is tested for operability. Here, the following vehicle 20 requests the lead vehicle 10 to execute a function that is verifiable by the following vehicle 20. The following vehicle may confirm the successful execution of the affirmative function through use of one or more systems disposed on the following vehicle such as for example, through use of various sensors or the like. In an example embodiment, the brake light 266 of the leading vehicle 10 is tested for operability as the affirmative function of the second verification criteria 420. Here, the following vehicle 20 requests the lead vehicle 10 to display one or more brake lights 266, 266'. The following vehicle may confirm the functionality of these brake lights 266, 266' through use of a vision system disposed on the following vehicle such as for example, through use of a forward looking camera and/or light sensor 264.

The third verification criteria 430 relates to the ability of the following vehicle to receive and accurately react to command signals from the leading vehicle 10. In this regard, the lead vehicle 10 in the example embodiment request a control profile to the following vehicle 20. The control profile in the example embodiment consists of acceleration and/or deceleration commands and/or any other commands as may be necessary or desired to prove that the following vehicle is compatible with the control commands of the leading vehicle 10. The following vehicle 20 receives the control profile and authorize the requested control and confirm the expected vehicle response.

In accordance with the example embodiment, pending one or more of the above steps are complete and pass, the two vehicles 10, 20 are permitted to be placed into platooning mode and allowed to move into close proximity with each other. As noted, in accordance with the example embodiment, the platoon initialization strategy requires completion one or more of a set of three (3) verification criteria prior to permitting or otherwise enabling platooning control or other operations. The set of three (3) verifications include a first verification criteria 410 that requires verification of continuous communication between vehicles for a more than a pre-defined duration for successful completion of the initiation strategy, a second verification criteria 420 that requires the successful execution of an affirmative function by the forward vehicle such as in the example the brake light 266 of the leading vehicle 10 to be operated responsive to a request from the following vehicle 20, and a third verification criteria 430 that requires an ability of the following vehicle to perform in accordance within an operational control profile. In general, the initialization strategy of the example embodiment helps to establish and ensure robust communication between two vehicles. Also, the functional brake light check is important and helpful because, should autonomous braking fail between the two vehicles it is critical that brake lights are in working order so the following driver can recognize when to manually brake the vehicle.

In accordance with an example embodiment, a system (12) is provided for initialization of platoon control between an associated following vehicle (20) and a set of at least one other associated vehicle comprising an associated leading vehicle (10) travelling forward of the associated following vehicle (20) to cooperatively travel as a platoon (P) along an associated roadway (1). The system (12) of the example embodiment includes a platoon control unit (300) in operative communication with an associated electronic control unit (ECU) of the associated following vehicle (20). The system (12) of the example embodiment further includes a communication receiver (250), a communication transmitter (250), a timer (241), and a sensor unit (245). Each of the communication receiver (250), the communication transmitter (250), the timer (241), and the sensor unit (245) are operatively coupled with the platoon control unit (300) in the example embodiment. The platoon control unit (300) includes a processor (230), a memory device (240) operatively coupled with the processor, and logic (241) stored in the memory and executable by the processor to initialize the platoon control of the associated following vehicle (20).

As mentioned above, a first verification criteria 410 requires, for successful completion of a first portion or step of the initiation strategy, the verification of continuous communication between vehicles for a more than a pre-defined duration. The communication receiver (250) coupled with the platoon control unit of the following vehicle is operable to receive, receive, at a first time (T1), a first communication signal ($1^{st}$_Comm_Sig) from the associated leading vehicle (10). The first communication signal ($1^{st}$_Comm_Sig) includes first communication data ($1^{st}$_Comm_Data) selectively usable by the associated following vehicle (20) to selectively effect the initialization of the platoon control.

The communication receiver of the following vehicle is further operable to receive, at a second time (T2), a second communication signal ($2^{nd}$_Comm_Sig) from the associated leading vehicle (10). The second communication signal ($2^{nd}$_Comm_Sig) includes second communication data ($2^{nd}$_Comm_Data) selectively usable by the associated following vehicle (20) to selectively effect the initialization of the platoon control.

The timer operatively coupled with the platoon control unit of the following vehicle is operable to determine a time interval (INT) between the first time (T1) and the second time (T2), and generate time interval data (INT_data) representative of the determined time interval (INT) between the first time (T1) and the second time (T2).

Further in accordance with the example embodiment, the logic of the platoon control unit is executable by the processor to compare the time interval data (INT_data) with predetermined maximum idle data (Max_Idle_Data) stored in the non-transient memory device of the platoon control unit. In the example embodiment, the predetermined maximum idle data (Max_Idle_Data) is representative of a time extent for concluding a first communication link between the leading and following vehicles (10, 20) is inoperable and/or inactive and/or has failed. The logic of the platoon control unit of the following vehicle is further executable by the processor to selectively generate communication persistency data (Link_Up_Data) responsive to the time interval data (INT_data) being less than the maximum idle data (Max_Idle_Data). In the example embodiment, the communication persistency data (Link_Up_Data) is representative of the communication link between the leading and following vehicles (10, 20) being operable and/or active and/or having not failed.

As further mentioned above and with continued reference to FIG. 4, in the second verification criteria 420, execution of an affirmative function by the leading vehicle 10 is tested for operability. Here, the following vehicle 20 requests the lead vehicle 10 to execute a function that is verifiable by the following vehicle 20. The following vehicle may confirm the successful execution of the affirmative function through use of one or more systems disposed on the following vehicle such as for example, through use of various sensors or the like. In the example embodiment, the brake light 266 of the leading vehicle 10 is tested in a second portion or step of the initiation strategy for operability. Here, the following vehicle 20 requests the lead vehicle 10 to display brake lights 266. The following vehicle may confirm the functionality of these brake lights 266 through use of a vision system disposed on the following vehicle such as for example, through use of a forward light sensor 264 and/or a forward looking video camera 245.

In accordance with the example embodiment, the communication transmitter operatively coupled with the platoon control unit of the following vehicle is operable to receive, from the platoon control unit, functional request command data (FRCD), convert the functional request command data (FRCD) into a functional request command signal (FRCD_Sig), and transmit the functional request command signal (FRCD_Sig) from the associated following vehicle (20) to the associated leading vehicle (10).

A sensor unit operatively coupled with the platoon control unit is disposed in the example embodiment on the associated following vehicle (20). Preferably, the sensor unit is operable to sense execution of the affirmative function by the associated leading vehicle (10), and generate affirmative function detected data (AFDD) representative of the sensed execution by the associated leading vehicle (10) of the affirmative function. In the example embodiment, the sensor unit is a forward vision sensor unit 264. The sensor unit 264 is operatively coupled with the platoon control unit and is disposed in the example embodiment on the associated following vehicle (20). Preferably, the forward vision sensor unit is operable to sense execution of an affirmative function by the associated leading vehicle (10), and generate affirmative function detected data (AFDD) representative of the sensed execution by the associated leading vehicle (10) of the affirmative function.

The logic of the platoon control unit of the following vehicle is executable by the processor to determine a correspondence between the functional request command data (FRCD) and the affirmative function detected data (AFDD), and to selectively generate functional handshake data (FHD) responsive to determining the correspondence between the functional request command data (FRCD) and the affirmative function detected data (AFDD).

In accordance with the system of the example embodiment, the forward vision sensor unit includes a forward facing video 245 camera operatively coupled with the platoon control unit and configured to be disposed on a forward area of the associated following vehicle (20). The camera is operable to sense, as the affirmative function, illumination of the brake light 266 by the associated leading vehicle (10). The camera 245 is further operable to generate the affirmative function detected data (AFDD) representative of the sensed illumination of the brake light 266 by the associated leading vehicle (10) as the execution of the affirmative function.

Further in accordance with the example embodiment and based on the above, the logic of the platoon control unit of the following vehicle is executable by the processor to determine a temporal correspondence between the functional request command data (FRCD) and the affirmative function detected data (AFDD) by generating the functional request command data (FRCD) for the communication transmitter and waiting a predetermined time for receiving the affirmative function detected data (AFDD) from the forward vision sensor unit. The logic 241 is further operable to then selectively generate the functional handshake data (FHD) responsive to receiving the affirmative function detected data (AFDD) from the forward vision sensor unit within the predetermined time after by generating the functional request command data (FRCD) for the communication transmitter.

As further mentioned above and with continued reference to FIG. 4, the third verification criteria 430 relates to the ability in a third portion or step of the initiation strategy of the following vehicle to receive and accurately react to command signals from the leading vehicle 10. In this regard, the lead vehicle 10 in the example embodiment requests a control profile to the following vehicle 20. The control profile in the example embodiment consists of acceleration and/or deceleration commands and/or any other commands as may be necessary or desired to prove that the following vehicle is compatible with the control commands of the leading vehicle 10. The following vehicle 20 receives the control profile and selectively authorizes the requested control and selectively confirms the expected vehicle response.

In particular, the communication receiver operatively coupled with the platoon control unit of the following vehicle is operable to receive, from the associated leading vehicle (10), a control profile request signal (Prof_Req_Sig) comprising control profile request data (Prof_Req_Data). The control profile request data (Prof_Req_Data) is selectively usable by the platoon control unit of the associated following vehicle (20) to determine an operational control protocol compatibility between the associated leading and following vehicles (10, 20).

The control profile request signal (Prof_Req_Sig) may include in accordance with the embodiment an acceleration and deceleration control command signal (Acc_Dec_Cmd_Sig). In this regard, the communication receiver of the following vehicle 20 is operable to receive, from the associated leading vehicle (10), an acceleration and deceleration control command signal (Acc_Dec_Cmd_Sig) as the control profile request signal (Prof_Req_Sig). The acceleration and deceleration control command signal (Acc_Dec_Cmd_Sig) includes acceleration and deceleration data (Acc_Dec_Cmd_Data).

The logic of the platoon control unit of the following vehicle 20 is executable by the processor to selectively determine the operational control protocol compatibility between the associated leading and following vehicles (10, 20) by comparing the received acceleration and deceleration data (Acc_Dec_Cmd_Data) with vehicle acceleration and deceleration capability data stored in the non-transient memory device of the platoon control unit. In the example embodiment, the vehicle acceleration and deceleration capability data is representative of physical acceleration and deceleration capabilities of the associated following vehicle (20). In a further embodiment, the logic of the platoon control unit (300) is executable by the processor to compare the control profile request data (Prof_Req_Data) with predetermined maximum control profile capabilities data (Max_Capable_Data) stored in the memory device of the platoon control unit (300). Here, the predetermined maximum control profile capabilities data (Max_Capable_Data) is representative of a set of one or more maximum operational performance capabilities of the associated following vehicle (20). In an embodiment, the first result is the control profile request data being determined to be within predetermined bounds of the predetermined maximum control profile capabilities data stored in the memory device of the platoon control unit.

Therefore, in accordance with the above, in an example embodiment, the logic of the platoon control unit is executable by the processor to selectively generate platoon initialization data (PI_Init_Data) for the initialization of the platoon control between the associated following vehicle and the set of at least one other associated vehicle comprising the associated leading vehicle responsive to the communication persistency data (Link_Up_Data) being selectively generated.

In accordance with a further example embodiment, the logic of the platoon control unit is executable by the processor to selectively generate the platoon initialization data (PI_Init_Data) responsive to the functional handshake data (FHD) being selectively generated.

In accordance with a further example embodiment, the logic of the platoon control unit is executable by the processor to selectively generate the platoon initialization data (PI_Init_Data) responsive to both of: the communication persistency data (Link_Up_Data) being selectively generated; and the functional handshake data (FHD) being selectively generated.

In accordance with a further example embodiment, the logic of the platoon control unit is executable by the processor to selectively generate the platoon initialization data (PI_Init_Data) responsive to a first result of the comparison between the control profile request data and the predetermined maximum control profile capabilities data stored in the memory device of the platoon control unit. In an embodiment, the first result is the control profile request data being determined to be within predetermined bounds of the predetermined maximum control profile capabilities data stored in the memory device of the platoon control unit.

In accordance with a further example embodiment, the logic of the platoon control unit is executable by the processor to selectively generate the platoon initialization data (PI_Init_Data) responsive to both of: the communication persistency data (Link_Up_Data) being selectively generated; and a first result of the comparison between the control profile request data and the predetermined maximum control profile capabilities data stored in the memory device of the platoon control unit. In an embodiment, the first result is the control profile request data being determined to be within predetermined bounds of the predetermined maximum control profile capabilities data stored in the memory device of the platoon control unit.

In accordance with a further example embodiment, the logic of the platoon control unit is executable by the processor to selectively generate the platoon initialization data (PI_Init_Data) responsive to both of: the functional handshake data (FHD) being selectively generated; and a first result of the comparison between the control profile request data and the predetermined maximum control profile capabilities data stored in the memory device of the platoon control unit. In an embodiment, the first result is the control profile request data being determined to be within predetermined bounds of the predetermined maximum control profile capabilities data stored in the memory device of the platoon control unit.

In accordance with a further example embodiment, the logic of the platoon control unit is executable by the processor to selectively generate the platoon initialization data (PI_Init_Data) responsive to all three (3) of: the communication persistency data (Link_Up_Data) being selectively generated; the functional handshake data (FHD) being selectively generated; and a first result of the comparison between the control profile request data and the predetermined maximum control profile capabilities data stored in the memory device of the platoon control unit. In an embodiment, the first result is the control profile request data being determined to be within predetermined bounds of the predetermined maximum control profile capabilities data stored in the memory device of the platoon control unit.

In each of the embodiments described above wherein the platoon initialization data (PI_Init_Data) is selectively generated in accordance with satisfaction of the one or more of the set of verification criteria prior to permitting or otherwise enabling platooning control or other coordinated vehicle control operations, the communication transmitter (250) is operable to receive the platoon initialization data (PI_Init_Data), convert the platoon initialization data (PI_Init_Data) into a platoon initialization signal (PI_Init_Sig), and transmit the platoon initialization signal (PI_Init_Sig) from the associated following vehicle (20) to the associated leading vehicle (10). The logic of the platoon control unit (300) is executable by the processor to communicate the platoon initialization data (PI_Init_Data) to the associated electronic control unit (ECU) of the associated following vehicle (20) for the initialization of the platoon control between the associated following vehicle (20) and the set of at least one other associated vehicle comprising the associated leading vehicle (10) for operating the associated following vehicle (20) by the associated electronic control unit (ECU) of the associated following vehicle (20) to cooperatively travel with the set of at least one other associated vehicle comprising the associated leading vehicle (10) as the platoon (P) along an associated roadway (1).

In accordance with the example embodiment, pending verification that one or more of the above steps are complete and passed successfully, the two vehicles 10, 20 are permitted to be placed into platooning mode and allowed to move into close proximity with each other. In general, the initialization strategy of the example embodiment helps to establish and ensure robust communication between two vehicles, ensure functionality of the brake light of the leading vehicle, and ensure that the control commands originating from the leading vehicle are understandable and executable by the following vehicle.

Overall, then and in accordance with the example embodiment, the logic of the platoon control unit is executable by the processor to selectively generate the platoon initialization data (PI_Init_Data) responsive to one or more of: determining the operational control protocol compatibility between the associated leading and following vehicles (10, 20); generating the communication persistency data (Link_Up_Data); and/or generating the functional handshake data (FHD).

The system of the example embodiment includes a communication transmitter operable to selectively transmit the platoon initialization data (PI_Init_Data) as a platoon initialization signal (PI_Init_Sig) from the associated following vehicle (20) to the associated leading vehicle (10) responsive to the logic of the platoon control unit determining functional and/or operational compatibilities between the between the associated leading and following vehicles (10, 20), thereby initializing the platooning.

In an embodiment, the control profile request signal (Prof_Req_Sig) is an acceleration and deceleration control command signal (Acc_Dec_Cmd_Sig). In this example embodiment, the communication receiver (250) is operable to receive, from the associated leading vehicle (10), an acceleration and deceleration control command signal (Acc_Dec_Cmd_Sig) as the control profile request signal (Prof_Req_Sig). The acceleration and deceleration control command signal (Acc_Dec_Cmd_Sig) includes acceleration and deceleration data (Acc_Dec_Cmd_Data) as the control profile request data (Prof_Req_Data) usable by the platoon control unit (300) of the associated following vehicle (20) to selectively communicate the acceleration and deceleration data (Acc_Dec_Cmd_Data) to the associated electronic control unit (ECU) of the associated following vehicle (20) for operating the associated following vehicle (20) by the associated electronic control unit (ECU) of the associated following vehicle (20) to physically perform an acceleration and deceleration exercise according to the acceleration and deceleration data (Acc_Dec_Cmd_Data). The logic of the platoon control unit (300) is executable by the processor to compare the acceleration and deceleration data (Acc_Dec_Cmd_Data) with the predetermined maximum control profile capabilities data (Max_Capable_Data) stored in the memory device of the platoon control unit (300). In this example embodiment, the predetermined maximum control profile capabilities data (Max_Capable_Data) is representative of a set of one or more maximum operational acceleration and deceleration performance capabilities of the associated following vehicle (20). The logic of the platoon control unit is further executable by the processor to selectively generate the platoon initialization data (PI_Init_Data) for the initialization of the platoon control between the associated following vehicle (20) and the set of at least one other associated vehicle comprising the associated leading vehicle (10) responsive to one or more of: a first result of the comparison between the acceleration and deceleration data (Acc_Dec_Cmd_Data) and the predetermined maximum control profile capabilities data (Max_Capable_Data) stored in the memory device of the platoon control unit (300), the communication persistency data (Link_Up_Data) being selectively generated, and/or the functional handshake data (FHD) being selectively generated. In an embodiment, the first result is the control profile request data being determined to be within predetermined bounds of the predetermined maximum control profile capabilities data stored in the memory device of the platoon control unit.

In an embodiment, the predetermined maximum control profile capabilities data representative of a set of one or more maximum operational performance capabilities of the associated following vehicle is resolved using a physical performance of the following vehicle of an exercise request received prior to platoon initialization from the leading vehicle of the to be formed platoon. In this example embodiment, the logic of the platoon control unit (300) is executable by the processor to communicate an acceleration and deceleration data (Acc_Dec_Cmd_Data) to the associated electronic control unit (ECU) of the associated following vehicle (20) for operating the associated following vehicle (20) by the associated electronic control unit (ECU) of the associated following vehicle (20) according to the acceleration and deceleration data (Acc_Dec_Cmd_Data) to perform the acceleration and deceleration exercise. The communication receiver (250) is operable to selectively receive, from the associated leading vehicle (10), acceleration and deceleration exercise data (Exercise_Data) representative of a successful physical performance of the acceleration and deceleration exercise by the associated following vehicle (20) as determined by the associated leading vehicle (10). The logic of the platoon control unit (300) is executable by the processor to selectively generate the platoon initialization data (PI_Init_Data) responsive to one or more of: the acceleration and deceleration exercise data (Exercise_Data) being received by the communication receiver (250) from the associated leading vehicle (10), the communication persistency data (Link_Up_Data) being selectively generated, and/or the functional handshake data (FHD) being selectively generated.

In an embodiment, the first and second communication signals ($1^{st}$_Comm_Sig, $2^{nd}$_Comm_Sig) from the associated leading vehicle (10), are first and second heartbeat signals ($1^{st}$_Heartbeat_Sig, $2^{nd}$_Heartbeat_Sig). In this example embodiment, the communication receiver (250) is operable to receive, at the first time (T1), a first heartbeat signal ($1^{st}$_Heartbeat_Sig) as the first communication signal ($1^{st}$_Comm_Sig) from the associated leading vehicle (10). The first heartbeat signal ($1^{st}$_Heartbeat_Sig) comprises first heartbeat data ($1^{st}$_Heartbeat_Data) data representative of a continuity of the first communication link at the first time (T1) between the associated leading and following vehicles (10, 20). The communication receiver (250) is further operable to receive, at the second time (T2) after the first time (T1), a second heartbeat signal ($2^{nd}$_Heartbeat_Sig) as the second communication signal ($2^{nd}$_Comm_Sig) from the associated leading vehicle (10), the second heartbeat signal ($2^{nd}$_Heartbeat_Sig) comprising second heartbeat data ($2^{nd}$_Heartbeat_Data) data representative of the continuity of the communication link at the second time (T2) between the associated leading and following vehicles (10, 20).

In an embodiment, the sensor unit (245) is a camera operatively coupled with the platoon control unit and configured to be disposed on the associated following vehicle (20). The camera of the example embodiment is operable to sense, as the affirmative function, a light signal resulting from illumination of a brake light by the associated leading vehicle (10). The camera of the example embodiment is further operable to selectively generate the affirmative function detected data (AFDD) responsive to the camera sending the light signal representative of the illumination of the brake light by the associated leading vehicle (10) as the execution of the affirmative function.

In an embodiment wherein the sensor unit (245) is a camera operatively coupled with the platoon control unit, the logic of the platoon control unit (300) is executable by the processor to determine a temporal correspondence between the first functional request command data (FRCD) and the affirmative function detected data (AFDD) by generating the first functional request command data (FRCD) for the communication transmitter and waiting a predetermined time for receiving the affirmative function detected data (AFDD) from the camera. In this embodiment, the logic of the platoon control unit (300) is further executable by the processor to selectively generate the functional handshake data (FHD) responsive to receiving the affirmative function detected data (AFDD) from the camera within the predetermined time after by generating the first functional request command data (FRCD) for the communication transmitter.

The system of the example embodiment is also operable with other vehicles (not shown) on the roadway. That is, the system of the example embodiment is operable with the other vehicles in addition to the leading vehicle 10 for platoon initialization. In this regard, the logic of the platoon control unit (300) is executable by the processor to generate third and fourth communication data ($3^{rd}$_Comm_Data, $4^{th}$_Comm_Data) selectively usable by the set of at least one other associated vehicle to selectively effect the initialization of the platoon control between the associated following vehicle (20) and the set of at least one other associated vehicle. The communication transmitter (250) is operable to receive, from the platoon control unit (300), the third and fourth communication data ($3^{rd}$_Comm_Data, $4^{th}$_Comm_Data). The communication transmitter (250) is operable to transmit at a third time (T3), a third communication signal ($3^{rd}$_Comm_Sig) from the associated following vehicle (20), the third communication signal ($3^{rd}$_Comm_Sig) comprising the third communication data ($3^{rd}$_Comm_Data) selectively usable by the set of at least one other associated vehicle to selectively effect the initialization of the platoon control. The communication transmitter (250) is operable to transmit, at a fourth time (T4), a fourth communication signal ($4^{th}$_Comm_Sig) from the associated following vehicle (20), the fourth communication signal ($4^{th}$_Comm_

Sig) comprising the fourth communication data ($4^{th}$_Comm_Data) selectively usable by the set of at least one other associated vehicle to selectively effect the initialization of the platoon control. In the example embodiment, a time interval between the third and fourth times (T3, T4) is less than the time extent for concluding a first communication link between the following vehicle (20) and the associated leading vehicle (10) is inoperable and/or inactive and/or has failed.

The communication receiver (250) is operable to receive a platoon initialization signal (PI_Init_Sig) from the set of at least one other associated vehicle to the associated following vehicle (20), and to convert the platoon initialization signal (PI_Init_Sig) into second platoon initialization data (PI_Init_ Data). The logic of the platoon control unit (300) is executable by the processor to communicate the second platoon initialization data (PI_Init_Data) to the associated electronic control unit (ECU) of the associated following vehicle (20) for the initialization of the platoon control between the associated following vehicle (20) and the set of at least one other associated vehicle for operating the associated following vehicle (20) by the associated electronic control unit (ECU) of the associated following vehicle (20) to cooperatively travel with the set of at least one other associated vehicle comprising as the platoon (P) along an associated roadway (1).

For operability with the other vehicles in addition to the leading vehicle 10 for platoon initialization in accordance with a further embodiment, the communication receiver (250) is operable to receive a second functional request command signal ($2^{nd}$_FRCD_Sig) from the set of at least one other associated vehicle, and convert the second functional request command signal (2nd_FRCD_Sig) to second functional request command data (2nd_FRCD_Data). The logic of the platoon control unit (300) is executable by the processor to communicate the second functional request command data (2nd_FRCD_Data) to the associated electronic control unit (ECU) of the associated following vehicle (20) for operating the associated following vehicle (20) by the associated electronic control unit (ECU) of the associated following vehicle (20) to execute a second affirmative function according to the second functional request command data (2nd_FRCD_Data). The communication receiver (250) is operable to receive a platoon initialization signal (PI_Init_Sig) from the set of at least one other associated vehicle to the associated following vehicle (20), and to convert the platoon initialization signal (PI_Init_Sig) into second platoon initialization data (PI_Init_Data). The logic of the platoon control unit (300) is executable by the processor to communicate the second platoon initialization data (PI_Init_Data) to the associated electronic control unit (ECU) of the associated following vehicle (20) for the initialization of the platoon control between the associated following vehicle (20) and the set of at least one other associated vehicle for operating the associated following vehicle (20) by the associated electronic control unit (ECU) of the associated following vehicle (20) to cooperatively travel with the set of at least one other associated vehicle comprising as the platoon (P) along an associated roadway (1).

For further operability with the other vehicles in addition to the leading vehicle 10 for platoon initialization in accordance with a further embodiment, the communication transmitter (250) is operable to transmit, at a third time (T3), a third heartbeat signal ($1^{st}$_Heartbeat_Sig) as a third communication signal ($3^{rd}$_Comm_Sig) from the associated following vehicle (20), the third heartbeat signal ($3^{rd}$_Heartbeat_Sig) comprising third heartbeat data ($3^{rd}$_Heartbeat_Data) representative of a continuity of a second communication link at the third time (T3) between the associated following vehicle (20) and the set of at least one other associated vehicle. The communication transmitter (250) is further operable to transmit, at a fourth time (T4) after the third time (T3), a fourth heartbeat signal ($4^{th}$_Heartbeat_Sig) as a fourth communication signal ($4^{th}$_Comm_Sig) from the associated following vehicle (20), the fourth heartbeat signal ($4^{th}$_Heartbeat_Sig) comprising fourth heartbeat data ($4^{th}$_Heartbeat_Data) representative of the continuity of the second communication link at the fourth time (T4) between the associated following vehicle (20) and the set of at least one other associated vehicle.

The communication receiver (250) of the example embodiment is operable to receive a platoon initialization signal (PI_Init_Sig) from the set of at least one other associated vehicle to the associated following vehicle (20), and to convert the platoon initialization signal (PI_Init_Sig) into second platoon initialization data (PI_Init_Data). The logic of the platoon control unit (300) is executable by the processor to communicate the second platoon initialization data (PI_Init_Data) to the associated electronic control unit (ECU) of the associated following vehicle (20) for the initialization of the platoon control between the associated following vehicle (20) and the set of at least one other associated vehicle for operating the associated following vehicle (20) by the associated electronic control unit (ECU) of the associated following vehicle (20) to cooperatively travel with the set of at least one other associated vehicle comprising as the platoon (P) along an associated roadway (1).

For further operability with the other vehicles in addition to the leading vehicle 10 for platoon initialization in accordance with a further embodiment, the communication transmitter (250) is operable to transmit, from the associated following vehicle (20) to the set of at least one other associated vehicle, a control profile request signal (Prof_Req_Sig) comprising control profile request data (Prof_Req_ Data) usable by a platoon control unit of the set of at least one other associated vehicle to selectively communicate the control profile request data (Prof_Req_Data) to an associated electronic control unit (ECU) of the set of at least one other associated vehicle for operating the set of at least one other associated vehicle by the associated electronic control unit (ECU) of the set of at least one other associated vehicle according to the control profile request data (Prof_Req_ Data). The communication receiver (250) is operable to receive a second platoon initialization signal (PI_Init_Sig) from the set of at least one other associated vehicle to the associated following vehicle (20). The logic of the platoon control unit (300) of the example embodiment is executable by the processor to communicate the second platoon initialization signal (PI_Init_Sig) to the associated electronic control unit (ECU) of the associated following vehicle (20) for the initialization of the platoon control between the associated following vehicle (20) and the set of at least one other associated vehicle for operating the associated following vehicle (20) by the associated electronic control unit (ECU) of the associated following vehicle (20) to cooperatively travel with the set of at least one other associated vehicle comprising as the platoon (P) along an associated roadway (1).

Figure 5:
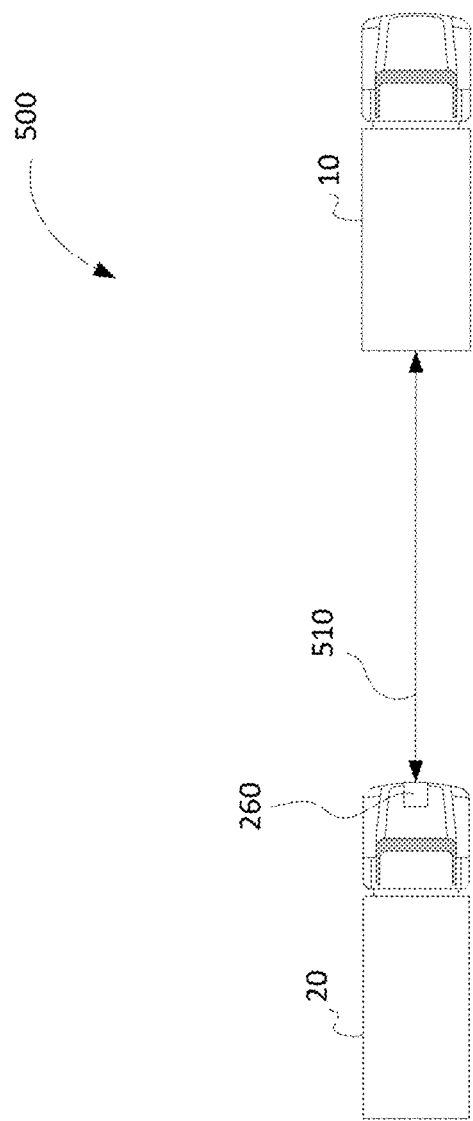
FIG. 5 is a schematic depiction of the set of vehicles of FIG. 4 moved close together into a platoon after completion of the initialization in accordance with an embodiment.

FIG. 5 is a schematic depiction of the set of vehicles of FIG. 4 moved close together into a platoon P (FIG. 1) after completion of the initialization in accordance with an embodiment. In this regard, the vehicles 10, 20 illustrated in FIG. 5 are disposed in a closely spaced platoon relationship 500 and, accordingly, are suitably engaged in active platooning control functions. The vehicles are preferably separated by a safe distance in terms of their respective operational characteristics and relative to their speeds and other considerations and in accordance with the successful completion of one or more of the set of platooning criteria 410, 420, 430 described above. The platooning vehicles 10, 20 follow each other on the road in close proximity using a Radar signal 510 to control the inter-vehicle distance.

Figure 6:
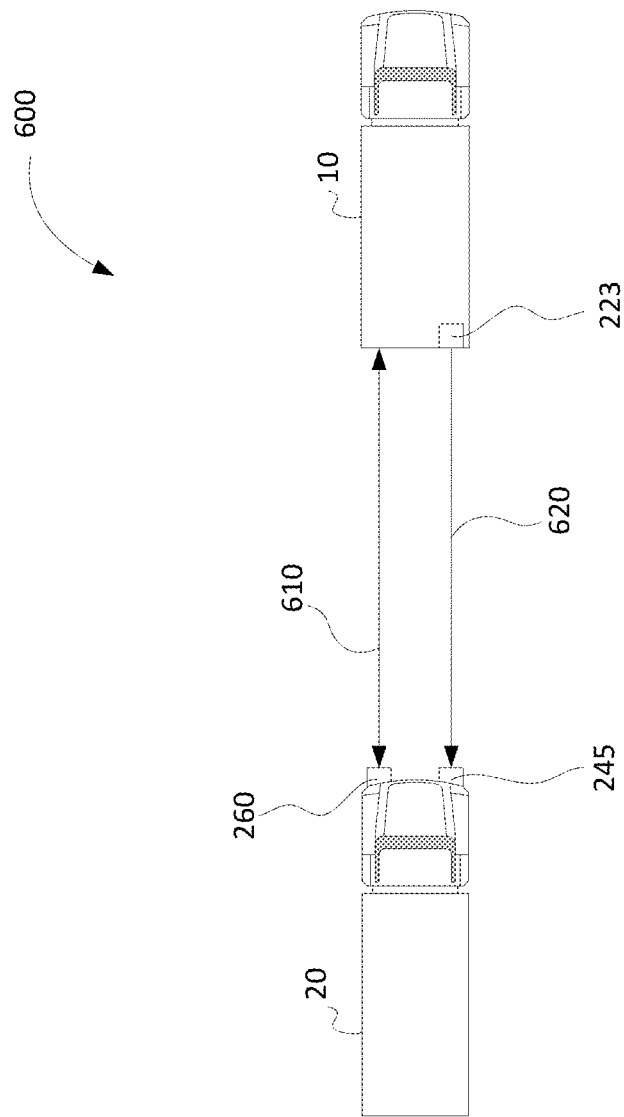
FIG. 6 is a schematic depiction of the platoon of FIG. 5 illustrating a secondary, backup or otherwise redundant system for communicating informational and command data between the platooning vehicles in accordance with an embodiment.

FIG. 6 is a schematic depiction of the platoon of FIG. 5 illustrating a secondary, backup or otherwise redundant system for communicating informational and command data between the platooning vehicles in accordance with an example embodiment. The set of vehicles of FIG. 6 are moved close together into a platoon P (FIG. 1) and have fully completed the initialization and verification in accordance with an embodiment as described above. In this regard, the vehicles 10, 20 illustrated in FIG. 6 are disposed in a closely spaced platoon relationship 600 and, accordingly, are suitably engaged in active platooning control functions. The vehicles are preferably separated by a safe distance in terms of their respective operational characteristics and relative to their speeds and other considerations and in accordance with the successful completion of the set of platooning criteria 410, 420, 430 described above. The platooning vehicles 10, 20 follow each other on the road in close proximity using a Radar signal 610 to control the inter-vehicle distance. However, a secondary, backup or otherwise redundant system is provided in the example embodiment for communicating informational and command data between the platooning vehicles in a manner as described below.

This example embodiment provides redundancy of trailer platooning to signify the state of the vehicles for cases of emergency or the like such as braking emergencies, etc. This builds additional redundancy into a platooning system.

The example embodiment proves a system and method for an infrared (IR) sensitive camera 245 located in a front area of the following vehicle 20, and one or more infrared (IR) lights 223 disposed for example in the taillight module of the leading vehicle 10 to provide a flashing signal at a specific frequency that a front facing DAS camera 245 can see and interpret for causes such as braking to provide an additional form of communication in case primary communication is not functioning properly at the time of the incident.

In accordance with the example embodiment shown, a forward vision sensor unit comprises an infrared (IR) camera 245 operatively coupled with the platoon control unit of the following vehicle. The infrared (IR) camera 245 is configured to be disposed on the front of the associated following vehicle (20), and is operable to sense, as platoon control commands, sequences of illumination by the associated leading vehicle (10) of an infrared (IR) command light 223 disposed on the associated leading vehicle (10). The infrared (IR) camera 245 is further configured to generate platoon control command data (PCCD) representative of the sensed sequences of illumination of the infrared (IR) command light by the associated leading vehicle (10).

Further in accordance with the example embodiment shown, the platoon control command data (PCCD) is used by the associated following vehicle (20) to manage participation in the platoon (P) together with the leading vehicle (10) by initiating acceleration and acceleration operations and following the associated leading vehicle (10) as the platoon (P) along the associated roadway (1) in accordance with the platoon control command data (PCCD) received from the associated leading vehicle (10). The example embodiment thereby provides redundancy of trailer platooning to signify the state of the vehicles for cases of emergency or the like such as braking emergencies, etc. This builds additional redundancy into the overall platooning system.

Figure 7:
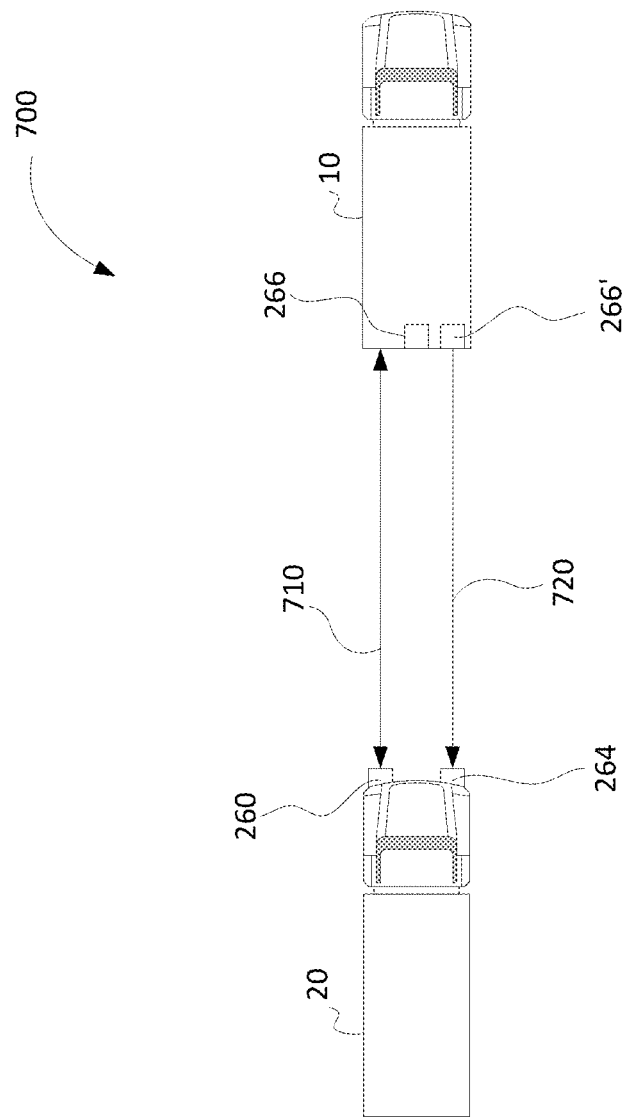
FIG. 7 is a schematic depiction of the platoon of FIG. 5 illustrating a secondary, backup or otherwise redundant system for communicating operational information from the leading vehicle to the following vehicle in accordance with an example embodiment.

FIG. 7 is a schematic depiction of the platoon of FIG. 5 illustrating a secondary, backup or otherwise redundant system in the form of a secondary brake light 266' for communicating operational information from the leading vehicle to the following vehicle in accordance with an example embodiment. In the example embodiment the secondary brake light 266' is a platoon specific brake light and is provided in addition to the regular or otherwise standard rear brake light 266 in the vehicles.

The set of vehicles of FIG. 7 are moved close together into a platoon P (FIG. 1) and have fully completed the initialization and verification in accordance with an embodiment as described above. In this regard, the vehicles 10, 20 illustrated in FIG. 7 are disposed in a closely spaced platoon relationship 700 and, accordingly, are suitably engaged in active platooning control functions. The vehicles are preferably separated by a safe distance in terms of their respective operational characteristics and relative to their speeds and other considerations and in accordance with the successful completion of the set of platooning criteria 410, 420, 430 described above. The platooning vehicles 10, 20 follow each other on the road in close proximity using a Radar signal 710 to control the inter-vehicle distance. However, a secondary, backup or otherwise redundant system is provided in the example embodiment for communicating informational and command data 720 between the platooning vehicles in a manner as described below.

This example embodiment provides redundancy of trailer platooning to signify the state of the vehicles for cases of emergency or the like such as braking emergencies, etc. This builds additional redundancy into a platooning system.

The example embodiment proves a system and method for a secondary brake light 266' disposed for example adjacent to the taillight module of the leading vehicle 10 to provide a selectively actuated signal or a signal flashing at a specific frequency that a front facing forward light sensor 264 can see and interpret for causes such as braking and/or other platooning command signals.

The example embodiment of FIG. 7 provides a platooning-specific brake lamp 266'. The benefits are numerous but one benefit is that redundant emergency braking feedback is provided to the following vehicle further reducing the possibility of a platooning vehicle collision.

Platooning places vehicles following at very close distances at highway speeds to realize improved fuel economy. This increases the likelihood of the following vehicle impacting the lead vehicle if the lead vehicle driver were to perform full emergency braking. Vehicle to Vehicle (V2V) communication is leveraged to communicate between the two vehicles but in the event of a V2V failure, the following vehicle must recognize the event in a timely manner and autonomously apply the brakes to prevent a collision. The fastest possible redundant notification is desired to prevent collision in the event of V2V failure.

As noted above, the communication receivers of the following one or more platooning vehicles 20 are operable to receive a deceleration command signal Decel_Sig from the associated leading vehicle 10. In the example embodiment, the deceleration command signal Decel_Sig comprises deceleration command data Decel_Data selectively usable by the associated following vehicle 20 to effect a deceleration operation of the associated following vehicle 20. As further noted above, preferably, the local V2V Unicast and V2V Broadcast communication between vehicles as will be described herein follows the J2945 DSRC communications specification. This specification at present, does not define one-to-one vehicle communications. Rather, operationally, each communication-capable vehicle sends the needed information by a broadcast to every other communication-capable vehicle within range, and the receiving vehicle(s) decide if they want to process the received message. For example only vehicles who are platoon capable and the driver has indicated, via a switch or user interface, that joining a platoon is desired, that vehicle will start broadcasting and listening for the platoon protocol messages. All other vehicles in the area will receive and ignore the platoon information. Accordingly, as will be used herein and for purposes of describing the example embodiments, "V2V Unicast" communication will refer to communication between a broadcasting vehicle and a single responding vehicle, and "V2V Broadcast communication" will refer to communication between a broadcasting vehicle and two or more responding vehicles. It is to be appreciated that "V2V Unicast" communication also refers to one-to-one direct vehicle communications as the J2945 DSRC communications specification is further developed or by use of any one or more other standards, specifications, or technologies now known or hereinafter developed.

The example embodiment of FIG. 7 adds a new lamp 266' to the trailer of platooning vehicles 10, 20 to visually indicate to the following vehicle 20 when an emergency stop is being demanded by the driver of the master and/or leading vehicle 10 or if an Autonomous Emergency Braking (AEB) event is commencing on the lead vehicle 10. This additional lamp 266' in accordance with one example embodiment does not illuminate during non AEB events or for autonomously demanded deceleration above a predetermined level. However, if the lead vehicle 10 driver demands manual braking greater than a specified deceleration level or if an AEB event has commenced on the lead vehicle 10 or the autonomous braking event of the lead vehicle 10 is greater than a specified deceleration level then, in accordance with this example embodiment, the secondary lamp 266' would illuminate accordingly.

It to be further appreciated that the auxiliary lamp 266' is also selectively used to flash a specified "State of Health" profile preferably using a non-visible wavelength which would not be visible to the following vehicle driver but would be visible to a camera 245 (FIG. 6) capable of detecting signals in the non-visible wavelength spectrum.

Figure 8:
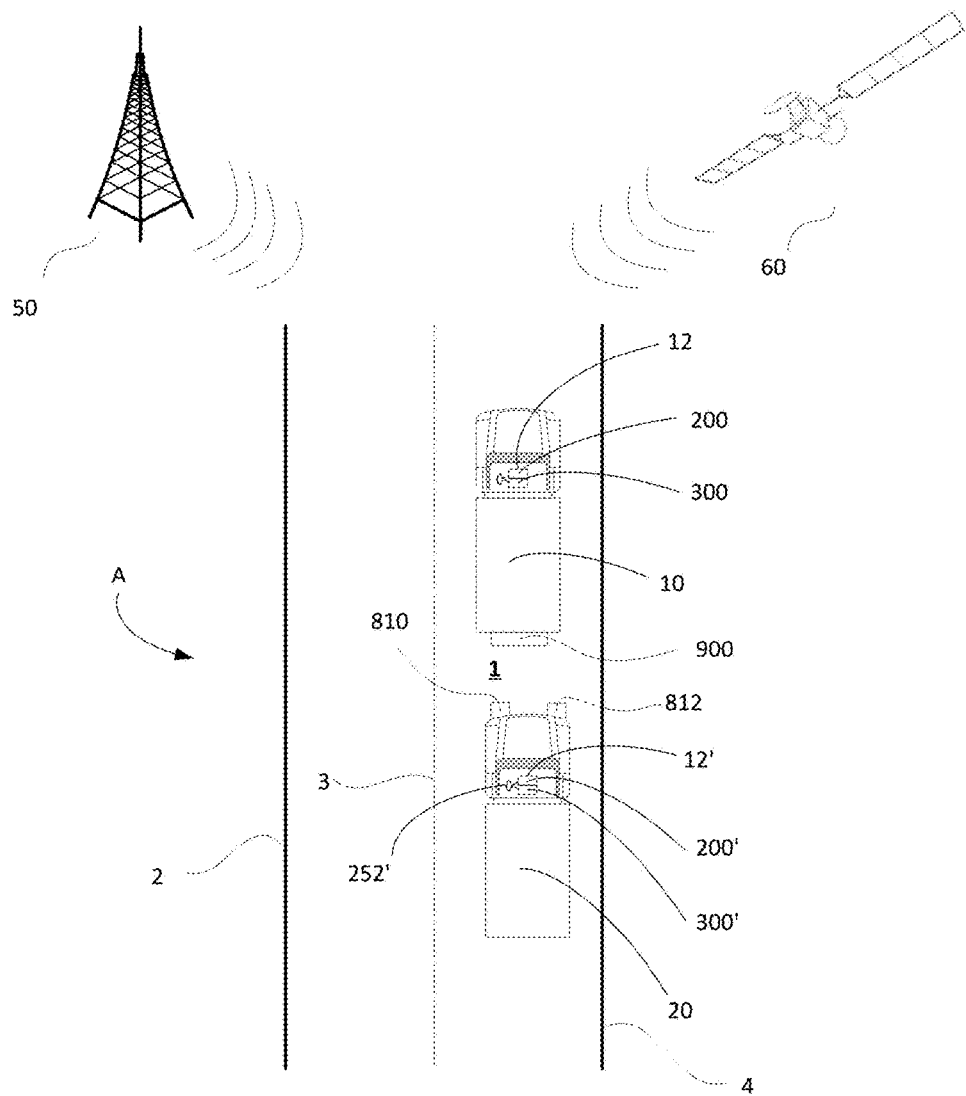
FIG. 8 is a schematic depiction of the platoon of FIG. 5 using a lane departure system for detecting lane markings and controlling steering of the following vehicle based on the detected lane markings in accordance with an example embodiment.
Figure 9A:
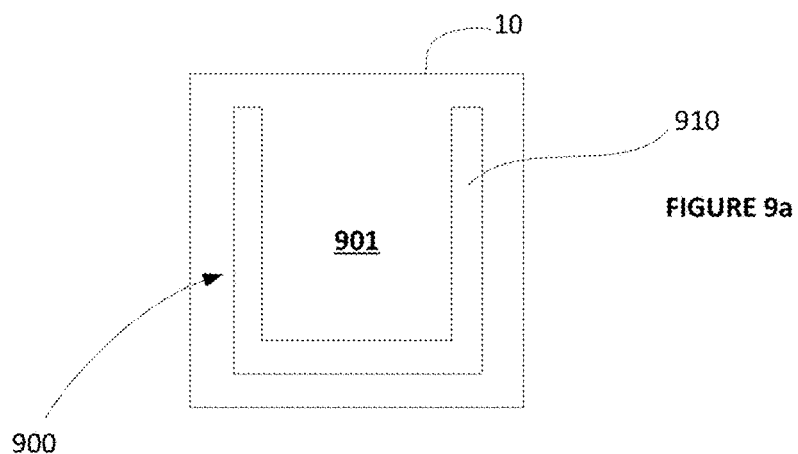
FIGS. 9a-9c are schematic illustrations of markings disposed on the rear portion of the leading vehicle of the platoon of FIG. 5 for use in accordance with an example embodiment by the following vehicle for lane departure operation and as a secondary, backup or otherwise redundant system to the lane departure operation depicted in FIG. 8.
Figure 9B:
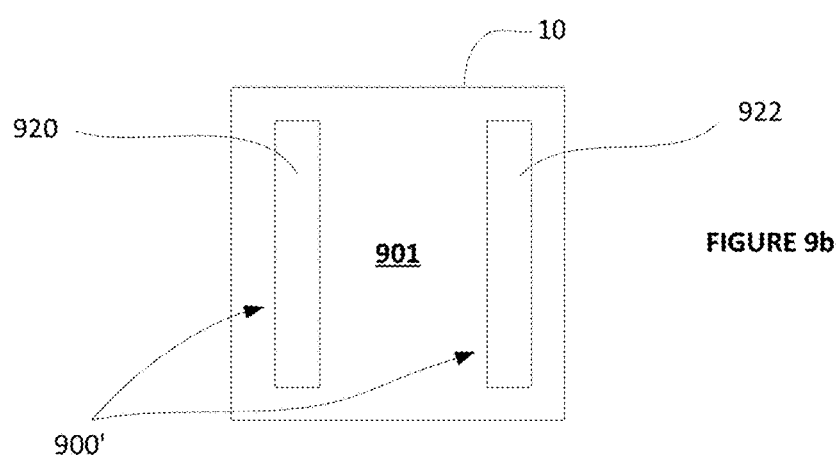
Figure 9C:
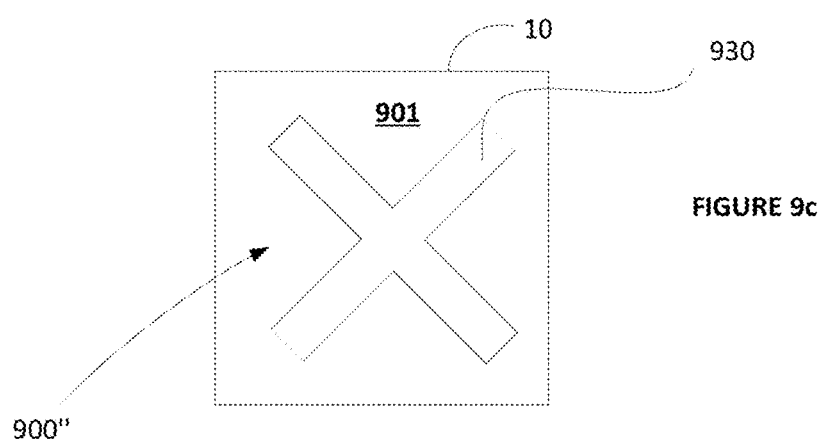

FIG. 8 is a schematic depiction of the platoon of FIG. 5 using a lane departure system for detecting lane markings and controlling steering of the following vehicle based on the detected lane markings in accordance with an example embodiment. FIGS. 9a-9c are schematic illustrations of markings disposed on the rear portion of the leading vehicle of the platoon of FIG. 5 for use in accordance with an example embodiment by the following vehicle for lane departure operation and as a secondary, backup or otherwise redundant system to the lane departure operation depicted in FIG. 8.

With reference now to FIGS. 8 and 9a-9c, a system and method is provided for helping to guide vehicles in their respective lanes in the event of a loss of the ability of on-board lane detection systems to detect lane markings 2, 3, 4 of the roadway 1 such as might be caused by equipment failure and/or bad weather conditions such as snow or ice covering the lane line markings 2, 3, 4 making them impossible to detect. Platooning vehicles follow each other on the road in close proximity using a Radar to control the distance. For the lateral control using automatic steering, a Lane Departure System tracks the lane markings 2, 3, 4 and steers the vehicle between the lines. A problem may occur when the Lane Departure System cannot track the lanes due to examples such as loss of lane markings 2, 3, 4, snow cover and sun glare. The lane markings 2, 3, 4 can suddenly disappear from detection with minimal or no driver warning.

In accordance with the example embodiment, a set of computer readable labels 900, 900', 900" is placed on the back 901 of the leading trailer 10. The set of computer readable labels 900, 900', 900" is visible to and otherwise readable and comprehendible by the Lane Departure System disposed in the following vehicle 20. The platoon control unit of the following vehicle is then able to readily use computer readable labels 900, 900', 900" as a tracking guide to thereby follow the lead vehicle 10 if the lane markings 2, 3, 4 are not visible by the lane detectors 810, 812.

The benefits are numerous, but one benefit is that the labels will be visible as a backup following method during a loss of tracking because of normal weather and maintenance occurrences. The rear 901 of the trailer is generally immune to sun glare and is visible at night because of lights from the following truck. Loss of lane markings 2, 3, 4 can be sudden and multiple methods of control are critical.

Therefore, in accordance with an example embodiment, a lane departure system (LDS) is operatively coupled with the platoon control unit and is configured to be disposed in the associated following vehicle (20). The lane departure system (LDS) is operable to generate a vehicle steering control signal (Steer_Sig) for use by an associated electronic control unit (ECU) of the associated following vehicle (20) to steer the associated following vehicle (20) between lane marker lines (2, 3, 4) of the associated roadway (1).

Further in accordance with the example embodiment of FIGS. 8 and 9a-9c, the lane departure system (LDS) comprises one or more lane line cameras 810, 812 operable to sense the lane marker lines 3, 4 of the associated roadway 1, and selectively generate a lane marker line signal (Line_Sig) responsive to sensing the lane marker lines. The forward vision sensor unit comprises a camera configured to sense a predetermined physical tracking pattern 900, 900', 900" arranged on the back panel 901 of the associated leading vehicle (10), and generate a tracking pattern signal (Pattern_Sig) representative of the sensed predetermined tracking pattern 900, 900', 900" arranged on the associated leading vehicle (10). In one form, the pattern 900 is a U-shaped pattern 910 as best show in FIG. 9a. In another one form, the pattern 900' is a pair of vertical bars 920, 922 spaced apart by a predetermined distance as best show in FIG. 9b. In yet another form, the pattern 900" is a X-shaped pattern 930 as best show in FIG. 9c.

The lane departure system (LDS) is responsive to one or more of the lane marker line signal (Line_Sig) generated by the one or more lane line cameras 810, 812 and/or the tracking pattern signal (Pattern_Sig) generated by the camera to generate the vehicle steering control signal (Steer_Sig) for use by the associated electronic control unit (ECU) of the associated following vehicle (20) to steer the associated following vehicle (20) between lane marker lines 3, 4 of the associated roadway (1).

Figure 10:
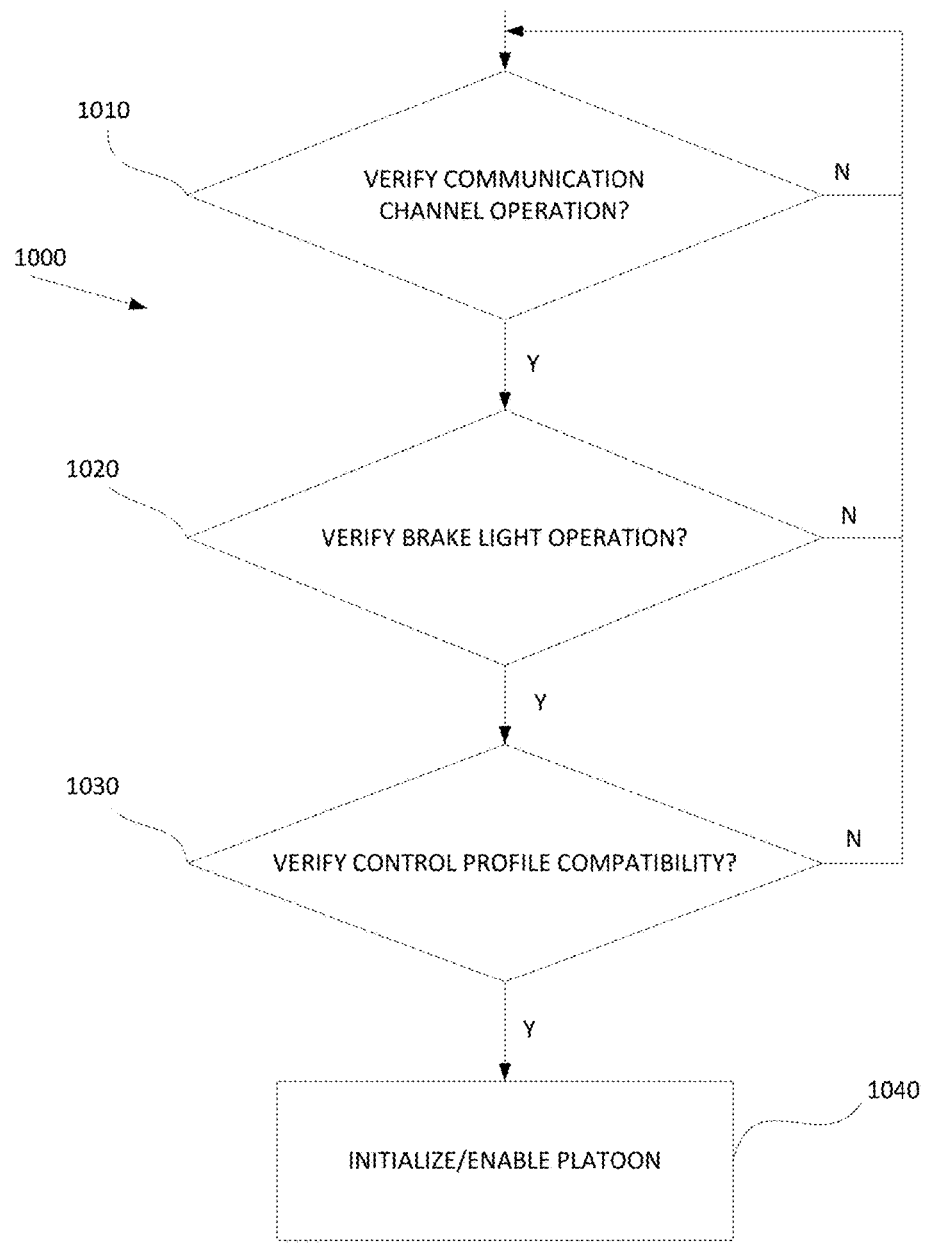
FIG. 10 is a flow diagram showing a method for platoon initialization to be completed in accordance with an example embodiment while the vehicles are spaced apart by a safe distance and before they are allowed to be controlled in the platoon and placed within the mutual close proximity of the platoon.

FIG. 10 is a flow diagram showing a method 1000 for platoon initialization to be completed in accordance with an example embodiment while the vehicles are spaced apart by a safe distance and before they are allowed to be controlled in the platoon and placed within the mutual close proximity of the platoon. As noted above, the electronic control system 12 is provided for communication and control functions. Logic such as software or other forms are executed by the processor of the control system 12 in order to conduct communication functionality, vehicle and driver parameter manipulation, and platoon management including, in the example embodiment, initialization and safety maintenance of platooning vehicles. although the portions of the method 500 are illustrated as functioning serially, it is to be appreciated that the particular serial arrangement is for ease of illustration purposes only, and that the embodiments herein are not limited the exact serial execution, and may be executed in any particular order or in any combination order or in parallel by the control system or an equivalent control system as may be necessary or desired.

In one example, executable instructions associated with performing the methods herein may be embodied as a logic encoded in one or more tangible media for execution. When executed, the instructions may perform a method. Thus, in one example, a logic encoded in one or more tangible media may store computer executable instructions that if executed by a machine (e.g., processor) cause the machine to perform method 1000. While executable instructions associated with the above method are described as being embodied as a logic encoded in one or more tangible media, it is to be appreciated that executable instructions associated with other example methods described herein may also be stored on a tangible media.

An example embodiment 1000 includes a set of one or more prerequisite steps 1010, 1020, 1030 to be completed between two or more vehicles while they are spaced apart by a safe distance and before they are allowed to be controlled in 1040 in the platoon and placed within the mutual close proximity of the platoon. The prerequisite steps 1010, 1020, 1030 of an example initialization protocol are to be satisfactorily completed by the vehicles before they are permitted to enter into a platooning control mode and prior to them being moved into close mutual proximity.

In accordance with an example embodiment, the platoon initialization strategy 1000 requires completion of a set of three (3) verification criteria prior to permitting or otherwise enabling platooning control or other operations. The set of three (3) verifications are shown schematically in the Figure and include a first verification criteria 1010 that requires verification of continuous communication between vehicles for a more than a pre-defined duration for successful completion of the initiation strategy.

In the second verification criteria 1020, an affirmative function of the leading vehicle 10 is tested for operability such as, for example, the brake light 266 of the leading vehicle 10 is tested for operability. Here, in the example embodiment shown, the following vehicle 20 requests the lead vehicle 10 to display brake lights 266. The following vehicle may confirm the functionality of these brake lights 266 through use of a vision system disposed on the following vehicle such as for example, through use of a forward looking camera 264.

The third verification criteria 1030 relates to the ability of the following vehicle to receive and accurately react to command signals from the leading vehicle 10. In this regard, the lead vehicle 10 in the example embodiment request a control profile to the following vehicle 20. The control profile in the example embodiment consists of acceleration and/or deceleration commands and/or any other commands as may be necessary or desired to prove that the following vehicle is compatible with the control commands of the leading vehicle 10. The following vehicle 20 receives the control profile and authorize the requested control and confirm the expected vehicle response.

In accordance with the example embodiment, pending all of the above steps 1010, 1020, 1030 are complete and pass, the two vehicles 10, 20 are permitted in step 1040 to be placed into platooning mode and allowed to move into close proximity with each other. In general, the initialization strategy 1000 of the example embodiment helps to establishing and ensure robust communication between two vehicles. Also, the functional brake light check 1020 is important and helpful because, should autonomous braking fail between the two vehicles it is critical that brake lights are in working order so the following driver can recognize when to manually brake the vehicle.

In accordance with the example embodiment, pending one or more of the steps described above are complete and pass, the two vehicles 10, 20 are permitted to be placed into platooning mode and allowed to move into close proximity with each other. As noted, in accordance with the example embodiment, the platoon initialization strategy requires completion one or more of a set of three (3) verification criteria prior to permitting or otherwise enabling platooning control or other operations. The set of three (3) verifications are shown in Table I below and include a first verification criteria 410 (FIG. 4) that requires verification of continuous communication between vehicles for a more than a pre-defined duration for successful completion of the initiation strategy, a second verification criteria 420 (FIG. 4) that requires the successful execution of an affirmative function by the forward vehicle such as in the example the brake light 266 of the leading vehicle 10 to be operated responsive to a request from the following vehicle 20, and a third verification criteria 430 (FIG. 4) that requires an ability of the following vehicle to perform in accordance within an operational control profile. In general, the initialization strategy of the example embodiment helps to establish and ensure robust communication between two vehicles. Also, the functional brake light check is important and helpful because, should autonomous braking fail between the two vehicles it is critical that brake lights are in working order so the following driver can recognize when to manually brake the vehicle. The platoon initialization cases #1-#7 are as described above.

TABLE 1

| CRITERIA | # 1 | # 2 | # 3 | # 4 | # 5 | # 6 | # 7 |
|---|---|---|---|---|---|---|---|
| Communications | 0 | 1 | 0 | 1 | 0 | 1 | 0 | 1 |
| Affirmative Function | 0 | 0 | 1 | 1 | 0 | 0 | 1 | 1 |
| Control Profile | 0 | 0 | 0 | 0 | 1 | 1 | 1 | 1 |

It is to be appreciated that the flow diagram showing the method 1000 for platoon initialization of FIG. 10 is an illustration of the platoon initialization case #7 in the Table I above. The platoon initialization cases #1-#6 in the Table I above are not shown, but could be easily created by simplifying the flow diagram of FIG. 10 since the platoon initialization cases #1-#6 require fewer verification criteria (one (1) or two (2)) than the platoon initialization case #7 (three (3)).

Figure 11:
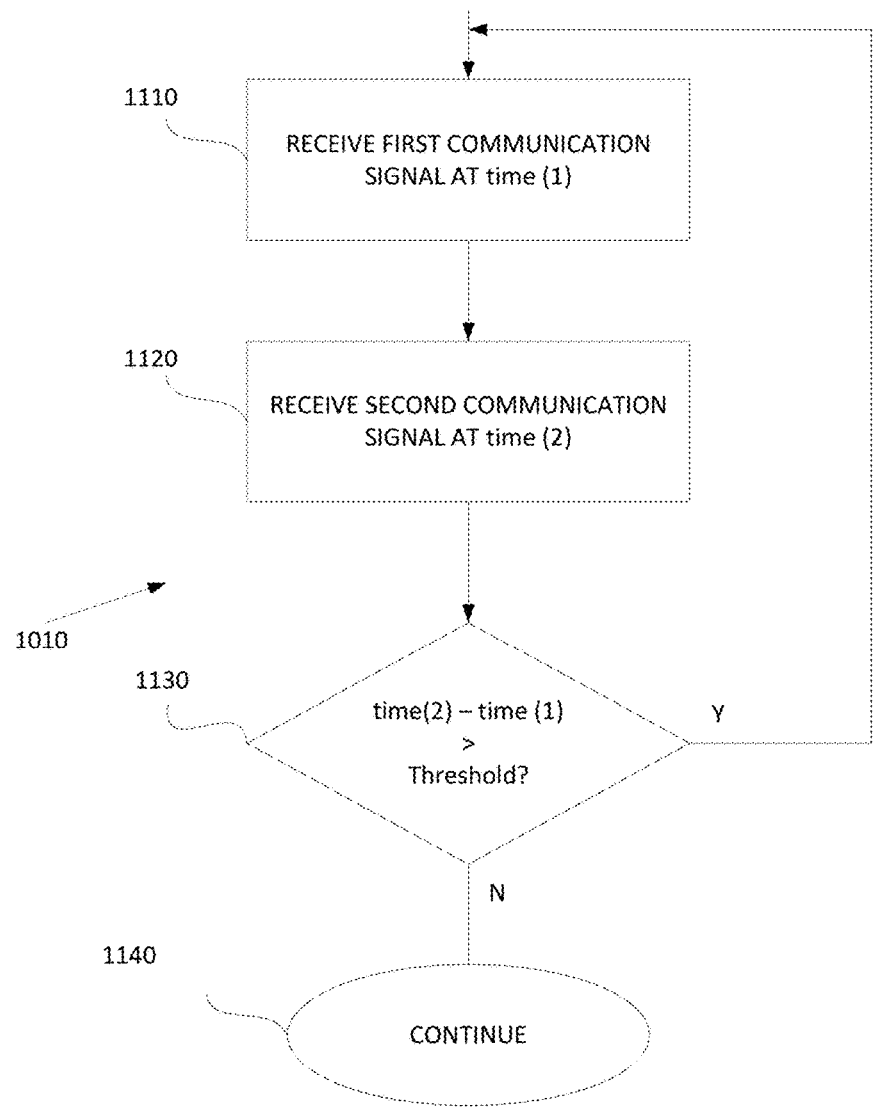
FIG. 11 is a flow diagram showing prerequisite sub-steps in accordance with an example embodiment of the platoon initialization method of FIG. 10 to be completed while the vehicles are spaced apart by a safe distance and before they are platooned.

FIG. 11 is a flow diagram showing prerequisite sub-steps 1110-1140 in accordance with an example embodiment of the platoon initialization method 1000 of FIG. 10 to be completed for verifying continuous communication between the vehicles while the vehicles are spaced apart by a safe distance and before or otherwise prior to a time the they are platooned or permitted to be platooned.

In step 1110 a communication receiver operatively coupled with the platoon control unit receives from the associated leading vehicle (10) at a first time (T1) a first communication signal ($1^{st}$_Comm_Sig) comprising first communication data ($1^{st}$_Comm_Data) selectively usable by the associated following vehicle (20) to selectively effect the initialization of the platoon control.

In step 1120 the communication receiver receives from the associated leading vehicle (10) at a second time (T2) after the first time (T1), a second communication signal ($2^{nd}$_Comm_Sig) comprising second communication data ($2^{nd}$_Comm_Data) selectively usable by the associated following vehicle (20) to selectively effect the initialization of the platoon control.

Figure 12:
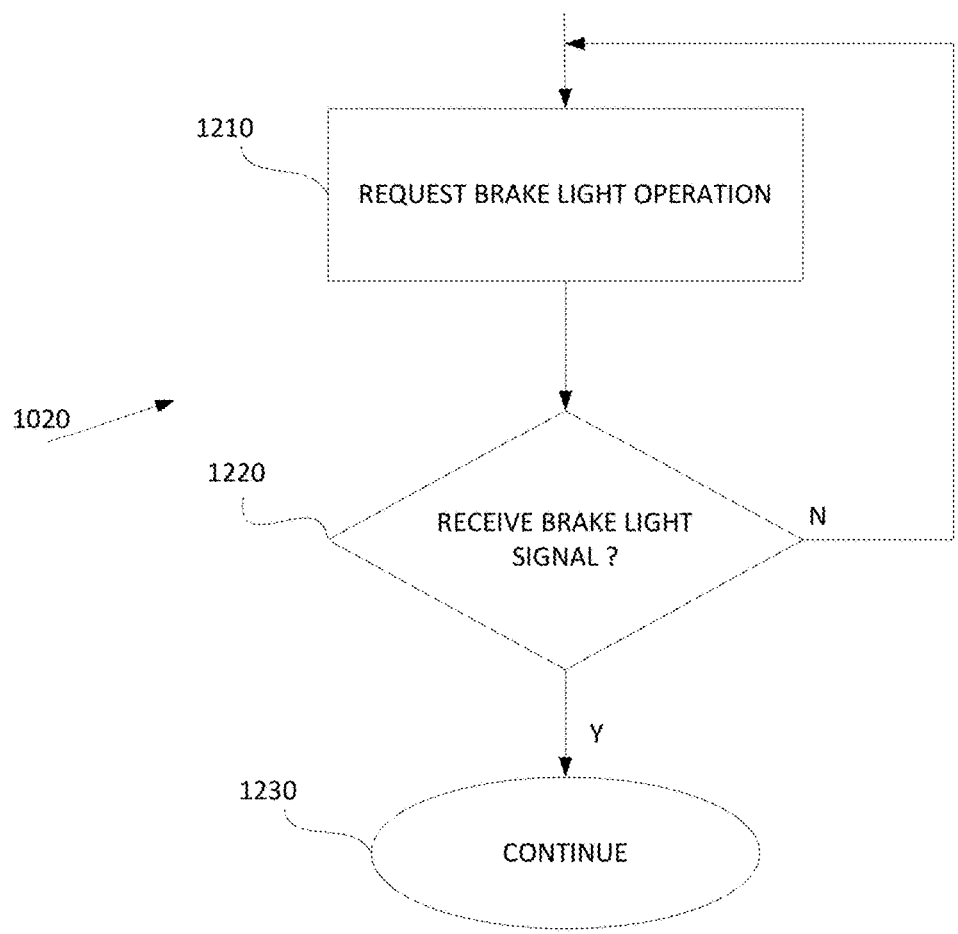
FIG. 12 is a flow diagram showing further prerequisite sub-steps in accordance with an example embodiment of the platoon initialization method of FIG. 10 to be completed while the vehicles are spaced apart by a safe distance and before they are platooned.

In step 1130, 1 timer operatively coupled with the platoon control unit determines a time interval (INT) between the first time (T1) and the second time (T2), and generates time interval data (INT_data) representative of the determined time interval (INT). The logic of the platoon control unit is executed by the processor to compare the time interval data (INT_data) with predetermined maximum idle data (Max_Idle_Data) stored in the non-transient memory device of the platoon control unit. The predetermined maximum idle data (Max_Idle_Data) being representative of a time extent for concluding a first communication link between the leading and following vehicles (10, 20) is inoperable and/or inactive and/or has failed, FIG. 12 is a flow diagram showing further prerequisite sub-steps 1210-1230 in accordance with an example embodiment of the platoon initialization method 1000 of FIG. 10 to be completed for verifying the operation of the brake light of the leading vehicle while the vehicles are spaced apart by a safe distance and before they are platooned.

In step 1210 functional request command data (FRCD) is received from the platoon control unit by a communication transmitter operatively coupled with the platoon control unit. The communication transmitter converts the functional request command data (FRCD) into a functional request command signal (FRCD_Sig). The communication transmitter transmits the functional request command signal (FRCD_Sig) from the associated following vehicle (20) to the associated leading vehicle (10).

A forward vision sensor unit operatively coupled with the platoon control unit and configured to be disposed on the associated following vehicle (20) senses at step 1220 execution of an affirmative function by the associated leading vehicle (10).

The forward vision sensor selectively generates at step 1230 affirmative function detected data (AFDD) representative of the sensed execution by the associated leading vehicle (10) of the affirmative function.

Figure 13:
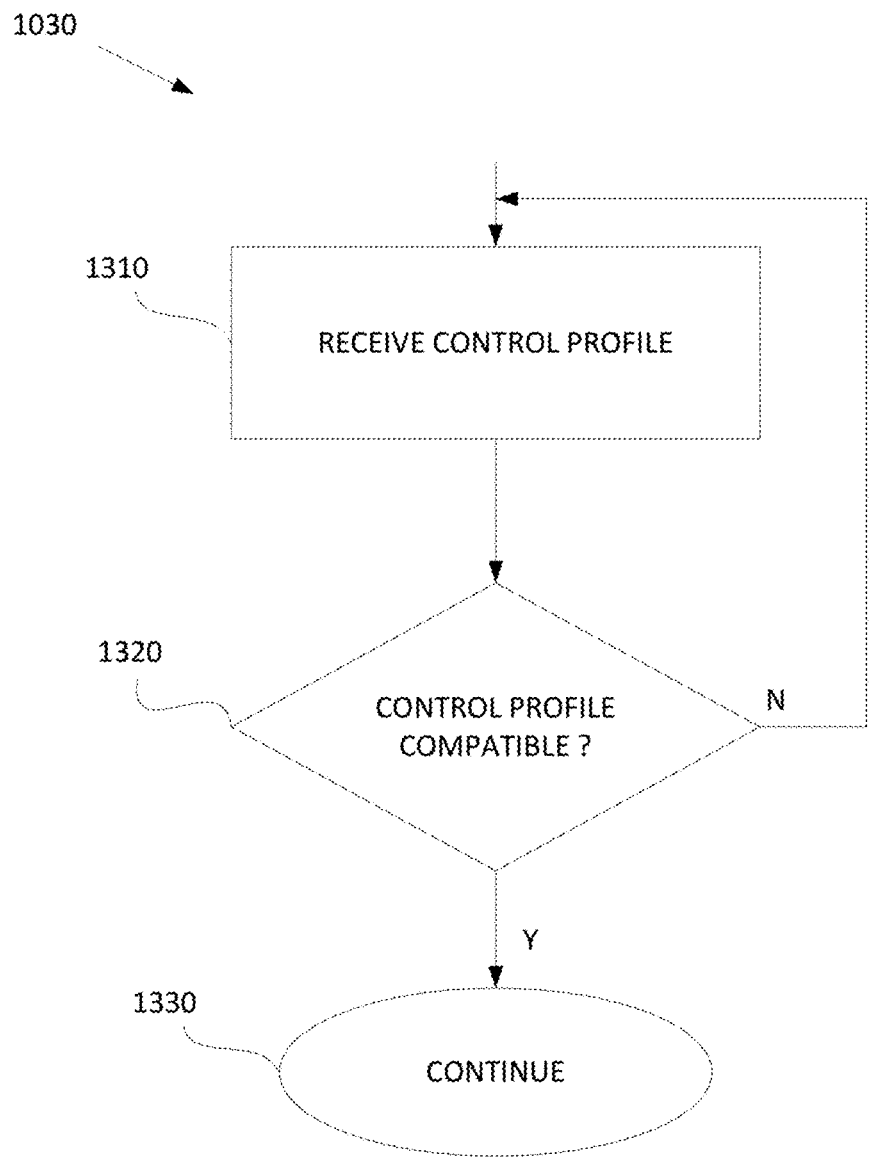
FIG. 13 is a flow diagram showing further additional prerequisite sub-steps in accordance with an example embodiment of the platoon initialization method of FIG. 10 to be completed while the vehicles are spaced apart by a safe distance and before they are platooned.

FIG. 13 is a flow diagram showing further additional prerequisite sub-steps 1310-1330 in accordance with an example embodiment of the platoon initialization method 1000 of FIG. 10 to be completed for verifying control profile compatibility between the vehicles while the vehicles are spaced apart by a safe distance and before they are platooned.

In step 1310 a control profile request signal (Prof_Req_Sig) is received from the associated leading vehicle (10) by the communication receiver of the following vehicle 20. The control profile request signal (Prof_Req_Sig) comprises control profile request data (Prof_Req_Data) selectively usable by the platoon control unit of the associated following vehicle (20) to determine an operational control protocol compatibility between the associated leading and following vehicles (10, 20).

In step 1320 an operational control protocol compatibility between the associated leading and following vehicles (10, 20) is determined.

Figure 14:
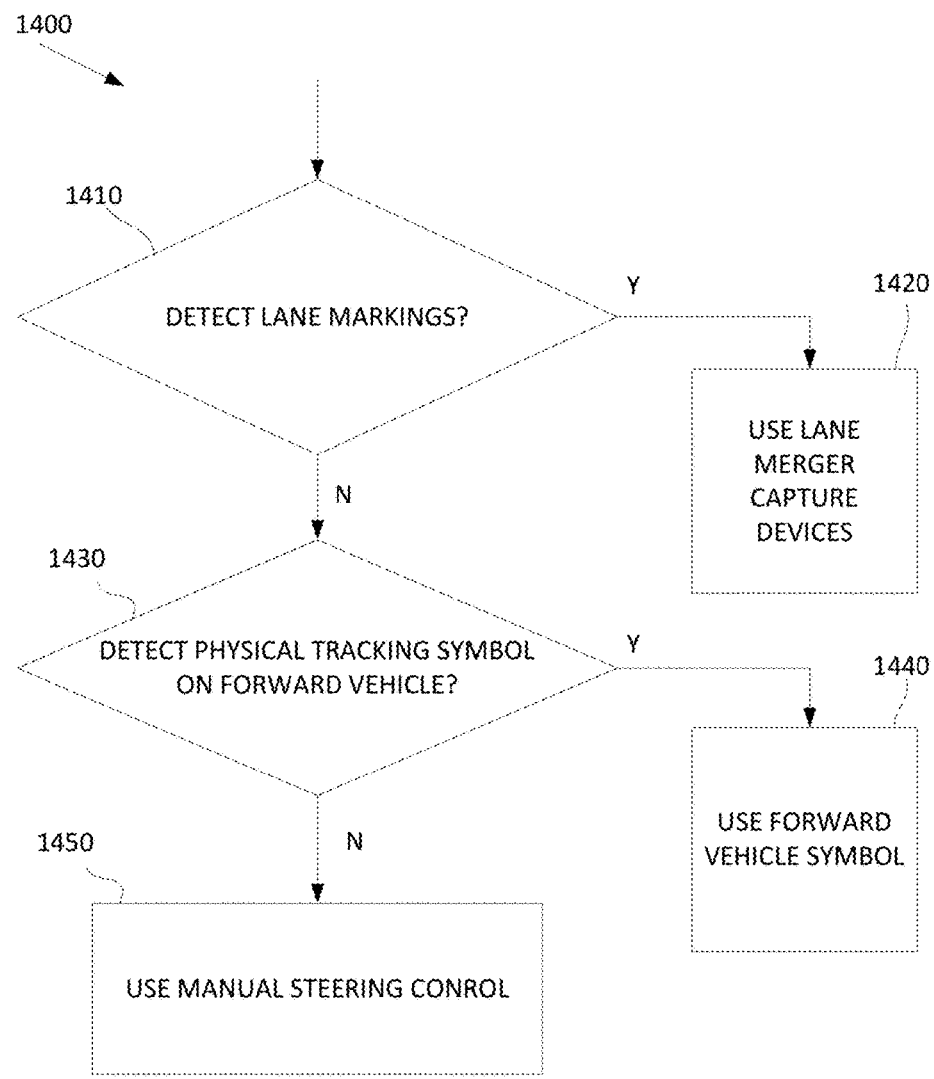
FIG. 14 is a flow diagram showing a method in a platoon following vehicle of using markings on a forward vehicle of the platoon for use in lane departure control in accordance with an example embodiment.

FIG. 14 is a flow diagram showing a method 1400 in a platoon following vehicle of using markings on a forward vehicle of the platoon for use in lane departure control in accordance with an example embodiment.

In the method 1400, a lane departure system (LDS) is operatively coupled with the platoon control unit and is disposed in the associated following vehicle (20). The LDS generates a vehicle steering control signal (Steer_Sig) for use by an associated electronic control unit (ECU) of the associated following vehicle (20) to steer the associated following vehicle (20) between lane marker lines (Lines) of the associated roadway (1).

The LDS is provided with one or more lane line cameras (LL_Cam) operable to sense in step 1410 the lane marker lines 2, 3, 4 of the associated roadway 1, and selectively generates a lane marker line signal (Line_Sig) responsive to sensing the lane marker lines. The lane marker line signal (Line_Sig) is directly usable by the LDS in step 1420.

However, when the lane marker lines 2, 3, 4 of the associated roadway 1 are not imagable by the LDS, a camera of the forward vision sensor unit senses in step 1430 a predetermined physical tracking pattern 900, 900', 900" arranged on the associated leading vehicle (10), and generates a tracking pattern signal (Pattern_Sig) representative of the sensed a predetermined tracking pattern 900, 900', 900" arranged on the associated leading vehicle (10). The tracking pattern signal (Pattern_Sig) is directly usable by the LDS in step 1440 as an alternative to the tracking pattern signal (Pattern_Sig) when the lane marker lines 2, 3, 4 of the associated roadway 1 are not imagable.

In accordance with the example embodiment, the method 1400 generates the vehicle steering control signal (Steer_Sig) by the lane departure system (LDS) responsive to one or more of the lane marker line signal (Line_Sig) generated by the one or more lane line cameras (LL_Cam) as in step 1420 and/or the tracking pattern signal (Pattern_Sig) generated by the camera as in step 1440.

Figure 15:
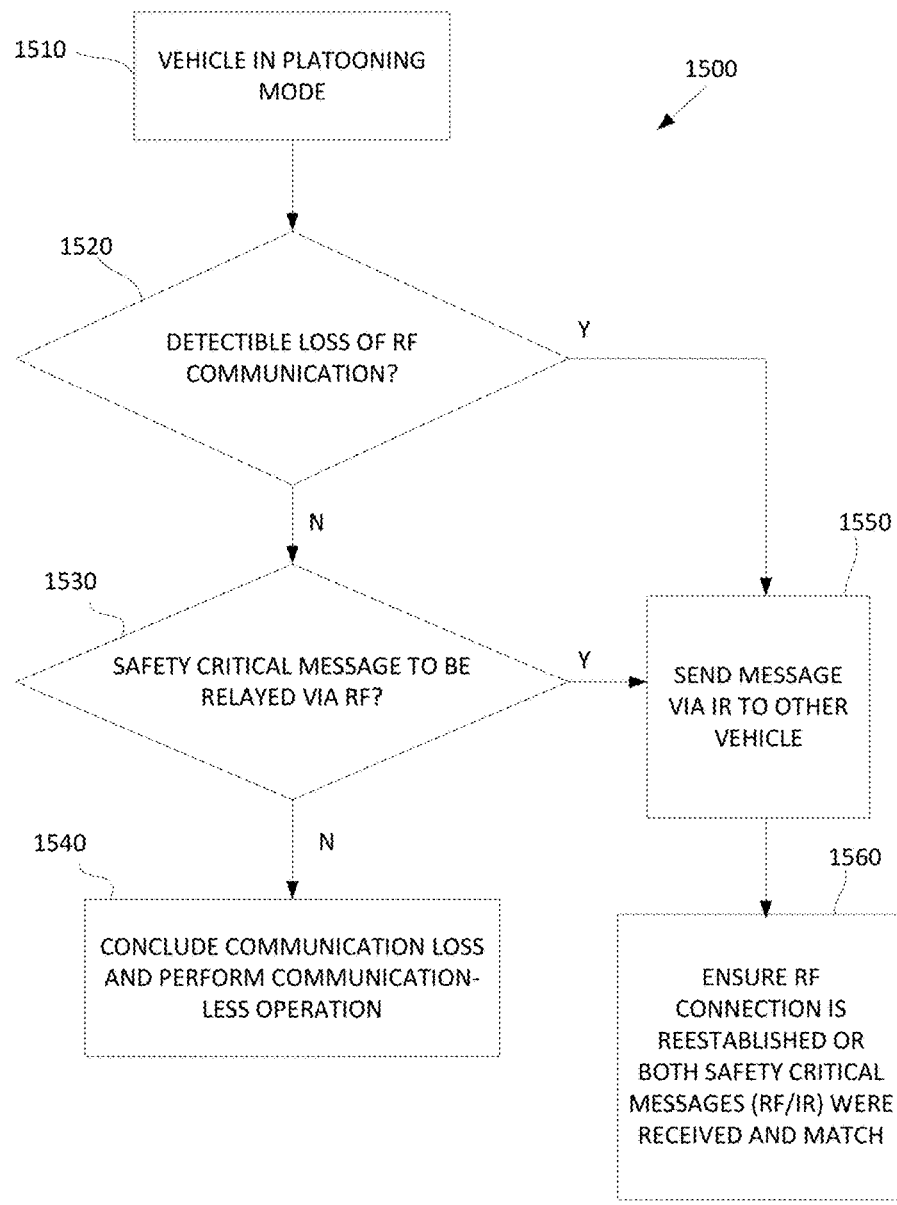
FIG. 15 is a flow diagram showing a method of providing an additional form of communication for functioning as a backup communication and/or redundant communication selectively in accordance with a malfunction or other degradation of a primary communication in accordance with an example embodiment.

FIG. 15 is a flow diagram showing a method 1500 of providing an additional form of communication for functioning as a backup communication and/or redundant communication selectively in accordance with a malfunction or other degradation of a primary communication in accordance with an example embodiment. In an example of the method 1500, the forward vision sensor unit comprises an infrared (IR) camera operatively coupled with the platoon control unit and configured to be disposed on the associated following vehicle (20). The IR camera is used to sense platoon control commands. Using the IR camera, sequences of illumination by the associated leading vehicle (10) of an infrared (IR) command light are sensed. Platoon control command data (PCCD) is generated. The platoon control command data (PCCD) is representative of the sensed sequences of illumination of the infrared (IR) command light by the associated leading vehicle (10). In the example embodiment, the platoon control command data (PCCD) is used by the associated following vehicle (20) to manage participation in the platoon (P) together with the leading vehicle (10) by initiating acceleration and acceleration operations and following the associated leading vehicle (10) as the platoon (P) along the associated roadway (1) in accordance with the platoon control command data (PCCD) received from the associated leading vehicle (10).

The method starts in step 1510 with the vehicles operating in a platooning mode. A loss of the RF DSRC Communication (FIG. 1) is detected in step 1520 whereupon the command and/or control messages are transmitted in step 1550 via IR communication. Step 1560 ensures the RF connection is reestablished or both safety critical messages (RF/IR) were received and match.

In step 1530 it is determined whether any safety critical messages nee to be relayed via RF communications and, if so, the safety related command and/or control messages are transmitted in step 1550 via IR communication. Step 1560 ensures the RF connection is reestablished or both safety critical messages (RF/IR) were received and match.

In step 1540, communication loss is determined and suitable communication-less control is performed by the platoon control unit.

It is to be understood that other embodiments will be utilized and structural and functional changes will be made without departing from the scope of the present invention. The foregoing descriptions of embodiments of the present invention have been presented for the purposes of illustration and description. It is not intended to be exhaustive or to limit the invention to the precise forms disclosed. Accordingly, many modifications and variations are possible in light of the above teachings. It is therefore intended that the scope of the invention be limited not by this detailed description.

The invention claimed is:

1. A system for initialization of platoon control between an associated following vehicle and a set of at least one other associated vehicle comprising an associated leading vehicle travelling forward of the associated following vehicle to cooperatively travel as a platoon along an associated roadway, the system comprising:
   a platoon control unit in operative communication with an associated electronic control unit of the associated following vehicle, the platoon control unit comprising:
      a processor;
      a memory device operatively coupled with the processor; and
      logic stored in the memory and executable by the processor to initialize the platoon control of the associated following vehicle;
   a communication receiver operatively coupled with the platoon control unit, the communication receiver being operable to:
      receive, at a first time, a first communication signal from the associated leading vehicle, the first communication signal comprising first communication data selectively usable by the associated following vehicle to selectively effect the initialization of the platoon control; and
      receive, at a second time, a second communication signal from the associated leading vehicle, the second communication signal comprising second communication data selectively usable by the associated following vehicle to selectively effect the initialization of the platoon control;
   a communication transmitter operatively coupled with the platoon control unit, the communication transmitter being operable to:
      receive, from the platoon control unit, first functional request command data;
      convert the first functional request command data into a first functional request command signal; and
      transmit the first functional request command signal from the associated following vehicle to the associated leading vehicle;
   a timer operatively coupled with the platoon control unit, the timer being operable to:
      determine a time interval between the first time and the second time; and
      generate time interval data representative of the determined time interval between the first time and the second time; and
   a sensor unit operatively coupled with the platoon control unit, the sensor unit being operable to:
      sense execution of an affirmative function by the associated leading vehicle responsive to the first functional request command signal; and
      selectively generate affirmative function detected data representative of an execution of the affirmative function by the associated leading vehicle being sensed by the sensor unit,
   wherein the logic of the platoon control unit is executable by the processor to compare the time interval data with predetermined maximum idle data stored in the memory device of the platoon control unit, the predetermined maximum idle data being representative of a time extent for concluding a first communication link between the following vehicle and the associated leading vehicle is inoperable and/or inactive and/or has failed,
   wherein the logic of the platoon control unit is executable by the processor to selectively generate communication persistency data responsive to the time interval data being less than the maximum idle data, the communication persistency data being representative of the first communication link between the following and leading vehicles being operable and/or active and/or having not failed,
   wherein the logic of the platoon control unit is executable by the processor to:
   determine a correspondence between the first functional request command data and the affirmative function detected data; and
   selectively generate functional handshake data responsive to determining the correspondence between the first functional request command data and the affirmative function detected data;
   wherein the logic of the platoon control unit is executable by the processor to selectively generate platoon initialization data for the initialization of the platoon control between the associated following vehicle and the set of at least one other associated vehicle comprising the associated leading vehicle responsive to:
      the communication persistency data being selectively generated; and
      the functional handshake data being selectively generated.

2. The system according to claim 1, wherein:
the communication receiver is operable to receive, from the associated leading vehicle, a control profile request signal comprising control profile request data usable by the platoon control unit of the associated following vehicle to selectively communicate the control profile request data to the associated electronic control unit of the associated following vehicle for operating the associated following vehicle by the associated electronic control unit of the associated following vehicle according to the control profile request data;

the logic of the platoon control unit is executable by the processor to compare the control profile request data with predetermined maximum control profile capabilities data stored in the memory device of the platoon control unit, the predetermined maximum control profile capabilities being representative of a set of one or more maximum operational performance capabilities of the associated following vehicle;

the logic of the platoon control unit is executable by the processor to selectively generate the platoon initialization data for the initialization of the platoon control between the associated following vehicle and the set of at least one other associated vehicle comprising the associated leading vehicle responsive to:

a first result of the comparison between the control profile request data and the predetermined maximum control profile capabilities data stored in the memory device of the platoon control unit;

the communication persistency data being selectively generated; and the functional handshake data being selectively generated.

3. The system according to claim 2, wherein:

the logic of the platoon control unit is executable by the processor to selectively generate the platoon initialization data for the initialization of the platoon control between the associated following vehicle and the set of at least one other associated vehicle comprising the associated leading vehicle responsive to:

the control profile request data being within bounds of the predetermined maximum control profile capabilities data as the first result;

the communication persistency data being selectively generated; and the functional handshake data being selectively generated.

4. The system according to claim 2, wherein:

the communication receiver is operable to receive, from the associated leading vehicle, an acceleration and deceleration control command signal as the control profile request signal, the acceleration and deceleration control command signal comprising acceleration and deceleration data as the control profile request data usable by the platoon control unit of the associated following vehicle to selectively communicate the acceleration and deceleration data to the associated electronic control unit of the associated following vehicle for operating the associated following vehicle by the associated electronic control unit of the associated following vehicle to perform an acceleration and deceleration exercise according to the acceleration and deceleration data;

the logic of the platoon control unit is executable by the processor to compare the acceleration and deceleration data with the predetermined maximum control profile capabilities data stored in the memory device of the platoon control unit, the predetermined maximum control profile capabilities data being representative of a set of one or more maximum operational acceleration and deceleration performance capabilities of the associated following vehicle;

the logic of the platoon control unit is executable by the processor to selectively generate the platoon initialization data for the initialization of the platoon control between the associated following vehicle and the set of at least one other associated vehicle comprising the associated leading vehicle responsive to:

a first result of the comparison between the acceleration and deceleration data the predetermined maximum control profile capabilities data stored in the memory device of the platoon control unit;

the communication persistency data being selectively generated; and the functional handshake data being selectively generated.

5. The system according to claim 4, wherein:

the logic of the platoon control unit is executable by the processor to selectively generate the platoon initialization data responsive to:

the acceleration and deceleration data being within bounds of physical acceleration and deceleration capabilities of the associated following vehicle as represented by the predetermined maximum control profile capabilities data stored in the memory device of the platoon control unit;

the communication persistency data being selectively generated; and the functional handshake data being selectively generated.

6. The system according to claim 4, wherein:

the logic of the platoon control unit is executable by the processor to communicate the acceleration and deceleration data to the associated electronic control unit of the associated following vehicle for operating the associated following vehicle by the associated electronic control unit of the associated following vehicle according to the acceleration and deceleration data to perform the acceleration and deceleration exercise;

the communication receiver is operable to selectively receive, from the associated leading vehicle, acceleration and deceleration exercise data representative of a successful physical performance of the acceleration and deceleration exercise by the associated following vehicle as determined by the associated leading vehicle;

the logic of the platoon control unit is executable by the processor to selectively generate the platoon initialization data responsive to:

the acceleration and deceleration exercise data being received by the communication receiver from the associated leading vehicle;

the communication persistency data being selectively generated; and the functional handshake data being selectively generated.

7. The system according to claim 1, wherein the communication receiver is operable to:

receive, at the first time, a first heartbeat signal as the first communication signal from the associated leading vehicle, the first heartbeat signal comprising first heartbeat data representative of a continuity of the first communication link at the first time between the associated leading and following vehicles; and receive, at the second time after the first time, a second heartbeat signal as the second communication signal from the associated leading vehicle, the second heartbeat signal comprising second heartbeat data representative of the continuity of the communication link at the second time between the associated leading and following vehicles.

8. The system according to claim 1, wherein:
the sensor unit comprises a camera operatively coupled with the platoon control unit and configured to be disposed on the associated following vehicle, the camera being operable to:
sense, as the affirmative function, a light signal resulting from illumination of a brake light by the associated leading vehicle; and
selectively generate the affirmative function detected data responsive to the camera sending the light signal representative of the illumination of the brake light by the associated leading vehicle as the execution of the affirmative function.

9. The system according to claim 8, wherein the logic of the platoon control unit is executable by the processor to:
determine a temporal correspondence between the first functional request command data and the affirmative function detected data by generating the first functional request command data for the communication transmitter and waiting a predetermined time for receiving the affirmative function detected data from the camera; and
selectively generate the functional handshake data responsive to receiving the affirmative function detected data from the camera within the predetermined time after by generating the first functional request command data for the communication transmitter.

10. The system according to claim 1, wherein:
the sensor unit comprises an infrared (IR) camera operatively coupled with the platoon control unit and configured to be disposed on the associated following vehicle, the IR camera being operable to:
sense, as platoon control commands, sequences of IR light signals resulting from illumination by the associated leading vehicle of an IR command light disposed on the associated leading vehicle; and
generate platoon control command data responsive to the IR camera sensing the IR light signals representative of the sequences of illumination of the IR command light by the associated leading vehicle; and
the platoon control command data is used by the associated following vehicle to manage participation in the platoon together with the leading vehicle by initiating acceleration and acceleration operations and following the associated leading vehicle as the platoon along the associated roadway in accordance with the platoon control command data received from the associated leading vehicle.

11. The system according to claim 1, further comprising:
a lane departure system operatively coupled with the platoon control unit and configured to be disposed in the associated following vehicle, the lane departure system being operable to generate a vehicle steering control signal for use by the associated electronic control unit of the associated following vehicle to assist in steering the associated following vehicle between lane marker lines of the associated roadway.

12. The system according to claim 11, wherein:
the lane departure system comprises one or more lane line cameras operable to sense the lane marker lines of the associated roadway, and selectively generate a lane marker line signal responsive to sensing the lane marker lines;
the sensor unit comprises a camera configured to sense a predetermined physical tracking pattern arranged on the associated leading vehicle, and generate a tracking pattern signal representative of the sensed a predetermined tracking pattern arranged on the associated leading vehicle;
the lane departure system is responsive to one or more of the lane marker line signal generated by the one or more lane line cameras and/or the tracking pattern signal generated by the camera to generate the vehicle steering control signal for use by the associated electronic control unit of the associated following vehicle to assist in steering the associated following vehicle between lane marker lines of the associated roadway.

13. The system according to claim 1, wherein:
the communication transmitter is operable to receive the platoon initialization data, convert the platoon initialization data into a platoon initialization signal, and transmit the platoon initialization signal from the associated following vehicle to the associated leading vehicle responsive to:
the communication persistency data being selectively generated; and
the functional handshake data being selectively generated; and
the logic of the platoon control unit is executable by the processor to communicate the platoon initialization data to the associated electronic control unit of the associated following vehicle for the initialization of the platoon control between the associated following vehicle and the set of at least one other associated vehicle comprising the associated leading vehicle for operating the associated following vehicle by the associated electronic control unit of the associated following vehicle to cooperatively travel with the set of at least one other associated vehicle comprising the associated leading vehicle as the platoon along an associated roadway responsive to:
the communication persistency data being selectively generated; and
the functional handshake data being selectively generated.

14. The system according to claim 1, wherein:
the logic of the platoon control unit is executable by the processor to:
generate third communication data selectively usable by the set of at least one other associated vehicle to selectively effect the initialization of the platoon control between the associated following vehicle and the set of at least one other associated vehicle; and
generate fourth communication data selectively usable by the set of at least one other associated vehicle to selectively effect the initialization of the platoon control between the associated following vehicle and the set of at least one other associated vehicle;
the communication transmitter is operable to:
receive, from the platoon control unit, the third communication data;
transmit, at a third time, a third communication signal from the associated following vehicle, the third communication signal comprising the third communication data selectively usable by the set of at least one other associated vehicle to selectively effect the initialization of the platoon control;
receive, from the platoon control unit, the fourth communication data; and
transmit, at a fourth time, a fourth communication signal from the associated following vehicle, the fourth communication signal comprising the fourth communication data selectively usable by the set of at least one other associated vehicle to selectively effect the initialization of the platoon control, wherein a time interval between the third and fourth times is less than the time extent for concluding a first communication link between the following vehicle and the associated leading vehicle is inoperable and/or inactive and/or has failed;

the communication receiver is operable to receive a platoon initialization signal from the set of at least one other associated vehicle to the associated following vehicle, and to convert the platoon initialization signal into second platoon initialization data; and the logic of the platoon control unit is executable by the processor to communicate the second platoon initialization data to the associated electronic control unit of the associated following vehicle for the initialization of the platoon control between the associated following vehicle and the set of at least one other associated vehicle for operating the associated following vehicle by the associated electronic control unit of the associated following vehicle to cooperatively travel with the set of at least one other associated vehicle comprising as the platoon along an associated roadway.

15. The system according to claim 1, wherein:

the communication receiver is operable to receive a second functional request command signal from the set of at least one other associated vehicle, and convert the second functional request command signal to second functional request command data; and the logic of the platoon control unit is executable by the processor to communicate the second functional request command data to the associated electronic control unit of the associated following vehicle for operating the associated following vehicle by the associated electronic control unit of the associated following vehicle to execute a second affirmative function according to the second functional request command data;

the communication receiver is operable to receive a platoon initialization signal from the set of at least one other associated vehicle to the associated following vehicle, and to convert the platoon initialization signal into second platoon initialization data; and the logic of the platoon control unit is executable by the processor to communicate the second platoon initialization data to the associated electronic control unit of the associated following vehicle for the initialization of the platoon control between the associated following vehicle and the set of at least one other associated vehicle for operating the associated following vehicle by the associated electronic control unit of the associated following vehicle to cooperatively travel with the set of at least one other associated vehicle comprising as the platoon along an associated roadway.

16. The system according to claim 1, wherein:

the communication transmitter is operable to:

transmit, at a third time, a third heartbeat signal as a third communication signal from the associated following vehicle, the third heartbeat signal comprising third heartbeat data representative of a continuity of a second communication link at the third time between the associated following vehicle and the set of at least one other associated vehicle; and transmit, at a fourth time after the third time, a fourth heartbeat signal as a fourth communication signal from the associated following vehicle, the fourth heartbeat signal comprising fourth heartbeat data representative of the continuity of the second communication link at the fourth time between the associated following vehicle and the set of at least one other associated vehicle;

the communication receiver is operable to receive a platoon initialization signal from the set of at least one other associated vehicle to the associated following vehicle, and to convert the platoon initialization signal into second platoon initialization data; and the logic of the platoon control unit is executable by the processor to communicate the second platoon initialization data to the associated electronic control unit of the associated following vehicle for the initialization of the platoon control between the associated following vehicle and the set of at least one other associated vehicle for operating the associated following vehicle by the associated electronic control unit of the associated following vehicle to cooperatively travel with the set of at least one other associated vehicle comprising as the platoon along an associated roadway.

17. The system according to claim 1, wherein:

the communication transmitter is operable to transmit, from the associated following vehicle to the set of at least one other associated vehicle, a control profile request signal comprising control profile request data usable by a platoon control unit of the set of at least one other associated vehicle to selectively communicate the control profile request data to an associated electronic control unit of the set of at least one other associated vehicle for operating the set of at least one other associated vehicle by the associated electronic control unit of the set of at least one other associated vehicle according to the control profile request data;

the communication receiver is operable to receive a second platoon initialization signal from the set of at least one other associated vehicle to the associated following vehicle; and the logic of the platoon control unit is executable by the processor to communicate the second platoon initialization signal to the associated electronic control unit of the associated following vehicle for the initialization of the platoon control between the associated following vehicle and the set of at least one other associated vehicle for operating the associated following vehicle by the associated electronic control unit of the associated following vehicle to cooperatively travel with the set of at least one other associated vehicle comprising as the platoon along an associated roadway.

18. A method for initialization of platoon control between an associated following vehicle and a set of at least one other associated vehicle comprising an associated leading vehicle travelling forward of the associated following vehicle to cooperatively travel as a platoon along an associated roadway, the method comprising:

providing a platoon control unit in operative communication with an associated electronic control unit of the associated following vehicle, the platoon control unit comprising a processor, a memory device operatively coupled with the processor, and logic stored in the memory and executable by the processor to initialize the platoon control of the associated following vehicle;

receiving from the associated leading vehicle at a first time by a communication receiver operatively coupled with the platoon control unit, a first communication signal comprising first communication data selectively usable by the associated following vehicle to selectively effect the initialization of the platoon control;

receiving from the associated leading vehicle at a second time by the communication receiver operatively coupled with the platoon control unit, a second communication signal comprising second communication data selectively usable by the associated following vehicle to selectively effect the initialization of the platoon control;

receiving by the communication transmitter from the platoon control unit, first functional request command data;

converting by the communication transmitter the first functional request command data into a first functional request command signal;

transmitting by the communication transmitter the first functional request command signal from the associated following vehicle to the associated leading vehicle;

determining by a timer operatively coupled with the platoon control unit, a time interval between the first time, and generating by the timer time interval data representative of the determined time interval between the first time;

sensing by a sensor unit operatively coupled with the platoon control unit execution of an affirmative function by the associated leading vehicle responsive to the first functional request command signal, selectively generating by the sensor unit affirmative function detected data representative of an execution of the affirmative function by the associated leading vehicle being sensed by the sensor unit;

executing the logic of the platoon control unit by the processor to compare the time interval data with predetermined maximum idle data stored in the memory device of the platoon control unit, the predetermined maximum idle data being representative of a time extent for concluding a first communication link between the following vehicle and the associated leading vehicle is inoperable and/or inactive and/or has failed;

executing the logic of the platoon control unit by the processor to selectively generate communication persistency data responsive to the time interval data being less than the maximum idle data, the communication persistency data being representative of the first communication link between the following and leading vehicles being operable and/or active and/or having not failed;

executing the logic of the platoon control unit by the processor to determine a correspondence between the first functional request command data and the affirmative function detected data, and to selectively generate functional handshake data responsive to determining the correspondence between the first functional request command data and the affirmative function detected data; and executing the logic of the platoon control unit by the processor to selectively generate platoon initialization data for the initialization of the platoon control between the associated following vehicle and the set of at least one other associated vehicle comprising the associated leading vehicle responsive to:
the communication persistency data being selectively generated; and
the functional handshake data being selectively generated.

19. The method according to claim 18, further comprising:
receiving by the communication receiver from the associated leading vehicle, a control profile request signal comprising control profile request data usable by the platoon control unit of the associated following vehicle to selectively communicate the control profile request data to the associated electronic control unit of the associated following vehicle for operating the associated following vehicle by the associated electronic control unit of the associated following vehicle according to the control profile request data;
executing the logic of the platoon control unit by the processor to compare the control profile request data with predetermined maximum control profile capabilities data stored in the memory device of the platoon control unit, the predetermined maximum control profile capabilities data being representative of a set of one or more maximum operational performance capabilities of the associated following vehicle; and
executing the logic of the platoon control unit by the processor to selectively generate the platoon initialization data for the initialization of the platoon control between the associated following vehicle and the set of at least one other associated vehicle comprising the associated leading vehicle responsive to:
a first result of the comparison between the control profile request data and the predetermined maximum control profile capabilities data stored in the memory device of the platoon control unit;
the communication persistency data being selectively generated; and
the functional handshake data being selectively generated.

20. The method according to claim 19, further comprising:
executing the logic of the platoon control unit by the processor to selectively generate the platoon initialization data for the initialization of the platoon control between the associated following vehicle and the set of at least one other associated vehicle comprising the associated leading vehicle responsive to:
the control profile request data being within bounds of the predetermined maximum control profile capabilities data as the first result;
the communication persistency data being selectively generated; and
the functional handshake data being selectively generated.

21. The method according to claim 19, further comprising:
receiving by the communication receiver from the associated leading vehicle, an acceleration and deceleration control command signal as the control profile request signal, the acceleration and deceleration control command signal comprising acceleration and deceleration data as the control profile request data usable by the platoon control unit of the associated following vehicle to selectively communicate the acceleration and deceleration data to the associated electronic control unit of the associated following vehicle for operating the associated following vehicle by the associated electronic control unit of the associated following vehicle to perform an acceleration and deceleration exercise according to the acceleration and deceleration data;
executing the logic of the platoon control unit by the processor to compare the acceleration and deceleration data with the predetermined maximum control profile capabilities data stored in the memory device of the platoon control unit, the predetermined maximum control profile capabilities data being representative of a set of one or more maximum operational acceleration and deceleration performance capabilities of the associated following vehicle; and executing the logic of the platoon control unit by the processor to selectively generate the platoon initialization data for the initialization of the platoon control between the associated following vehicle and the set of at least one other associated vehicle comprising the associated leading vehicle responsive to:

a first result of the comparison between the acceleration and deceleration data the predetermined maximum control profile capabilities data stored in the memory device of the platoon control unit;

the communication persistency data being selectively generated; and the functional handshake data being selectively generated.

22. The method according to claim 21, further comprising:

executing the logic of the platoon control unit by the processor to selectively generate the platoon initialization data responsive to:

the acceleration and deceleration data being within bounds of physical acceleration and deceleration capabilities of the associated following vehicle as represented by the predetermined maximum control profile capabilities data stored in the memory device of the platoon control unit;

the communication persistency data being selectively generated; and the functional handshake data being selectively generated.

23. The method according to claim 21, further comprising:

executing the logic of the platoon control unit by the processor to communicate the acceleration and deceleration data to the associated electronic control unit of the associated following vehicle for operating the associated following vehicle by the associated electronic control unit of the associated following vehicle according to the acceleration and deceleration data to perform the acceleration and deceleration exercise;

selectively receiving by the communication receiver from the associated leading vehicle, acceleration and deceleration exercise data representative of a successful physical performance of the acceleration and deceleration exercise by the associated following vehicle as determined by the associated leading vehicle; and executing the logic of the platoon control unit by the processor to selectively generate the platoon initialization data responsive to:

the acceleration and deceleration exercise data being received by the communication receiver from the associated leading vehicle;

the communication persistency data being selectively generated; and the functional handshake data being selectively generated.

24. The method according to claim 18, further comprising:

receiving by the communication receiver at the first time, a first heartbeat signal as the first communication signal from the associated leading vehicle, the first heartbeat signal comprising first heartbeat data data representative of a continuity of the first communication link at the first time between the associated leading and following vehicles; and receiving by the communication receiver at the second time after the first time, a second heartbeat signal as the second communication signal from the associated leading, the second heartbeat signal comprising second heartbeat data representative of the continuity of the communication link at the second time between the associated leading and following vehicles.

25. The method according to claim 18, further comprising:

sensing by a camera of the sensor unit a light signal as the affirmative function, the light signal resulting from illumination of a brake light by the associated leading vehicle; and selectively generating by the sensor unit the affirmative function detected data responsive to the camera sending the light signal representative of the illumination of the brake light by the associated leading vehicle as the execution of the affirmative function.

26. The method according to claim 25, further comprising:

executing the logic of the platoon control unit by the processor to determine a temporal correspondence between the first functional request command data and the affirmative function detected data by generating the first functional request command data for the communication transmitter and waiting a predetermined time for receiving the affirmative function detected data from the camera; and executing the logic of the platoon control unit by the processor to selectively generate the functional handshake data responsive to receiving the affirmative function detected data from the camera within the predetermined time after by generating the first functional request command data for the communication transmitter.

27. The method according to claim 18, further comprising:

sensing by an infrared (IR) camera of the sensor unit sequences of IR light signals as platoon control commands, the sequences of IR light signals resulting from illumination by the associated leading vehicle of an IR command light disposed on the associated leading vehicle; and generating by the sensor unit platoon control command data responsive to the IR camera sensing the IR light signals representative of the sequences of illumination of the IR command light by the associated leading vehicle; and using the platoon control command data by the associated following vehicle to manage participation in the platoon together with the leading vehicle by initiating acceleration and acceleration operations and following the associated leading vehicle as the platoon along the associated roadway in accordance with the platoon control command data received from the associated leading vehicle.

28. The method according to claim 18, further comprising:

generating, by a lane departure system operatively coupled with the platoon control unit and configured to be disposed in the associated following vehicle, a vehicle steering control signal for use by the associated electronic control unit of the associated following vehicle to assist in steering the associated following vehicle between lane marker lines of the associated roadway.

29. The method according to claim 28, further comprising:
sensing by one or more lane line cameras of the lane departure system the lane marker lines of the associated roadway;
selectively generating by the lane departure system a lane marker line signal responsive to sensing the lane marker lines;
sensing by a camera of the sensor unit a predetermined physical tracking pattern (Pattern) arranged on the associated leading vehicle;
generating by the sensor unit a tracking pattern signal representative of the sensed a predetermined tracking pattern arranged on the associated leading vehicle; and
generating the vehicle steering control signal by the lane departure system responsive to one or more of the lane marker line signal generated by the one or more lane line cameras and/or the tracking pattern signal generated by the camera, the vehicle steering control signal being for use by the associated electronic control unit of the associated following vehicle to assist in steering the associated following vehicle between lane marker lines of the associated roadway.

30. The method according to claim 18, further comprising:
receiving the platoon initialization data by the communication transmitter;
converting the platoon initialization data into a platoon initialization signal by the communication transmitter;
transmitting by the communication transmitter the platoon initialization signal from the associated following vehicle to the associated leading vehicle responsive to:
the communication persistency data being selectively generated; and
the functional handshake data being selectively generated; and
executing the logic of the platoon control unit by the processor to communicate the platoon initialization data to the associated electronic control unit of the associated following vehicle for the initialization of the platoon control between the associated following vehicle and the set of at least one other associated vehicle comprising the associated leading vehicle for operating the associated following vehicle by the associated electronic control unit of the associated following vehicle to cooperatively travel with the set of at least one other associated vehicle comprising the associated leading vehicle as the platoon along an associated roadway responsive to:
the communication persistency data being selectively generated; and
the functional handshake data being selectively generated.

31. The method according to claim 18, further comprising:
the logic of the platoon control unit is executable by the processor to:
executing the logic of the platoon control unit by the processor to generate third communication data selectively usable by the set of at least one other associated vehicle to selectively effect the initialization of the platoon control between the associated following vehicle and the set of at least one other associated vehicle; and
executing the logic of the platoon control unit by the processor to generate fourth communication data selectively usable by the set of at least one other associated vehicle to selectively effect the initialization of the platoon control between the associated following vehicle and the set of at least one other associated vehicle;
operating the communication transmitter to:
receive, from the platoon control unit, the third communication data;
transmit, at a third time, a third communication signal from the associated following vehicle, the third communication signal comprising the third communication data selectively usable by the set of at least one other associated vehicle to selectively effect the initialization of the platoon control;
receive, from the platoon control unit, the fourth communication data; and
transmit, at a fourth time, a fourth communication signal from the associated following vehicle, the fourth communication signal comprising the fourth communication data selectively usable by the set of at least one other associated vehicle to selectively effect the initialization of the platoon control,
wherein a time interval between the third and fourth times is less than the time extent for concluding a first communication link between the following vehicle and the associated leading vehicle is inoperable and/or inactive and/or has failed;
receiving by the communication receiver a platoon initialization signal from the set of at least one other associated vehicle to the associated following vehicle, and to convert the platoon initialization signal into second platoon initialization data; and
executing the logic of the platoon control unit by the processor to communicate the second platoon initialization data to the associated electronic control unit of the associated following vehicle for the initialization of the platoon control between the associated following vehicle and the set of at least one other associated vehicle for operating the associated following vehicle by the associated electronic control unit of the associated following vehicle to cooperatively travel with the set of at least one other associated vehicle comprising as the platoon along an associated roadway.

32. The method according to claim 18, further comprising:
receiving by the communication receiver a second functional request command signal from the set of at least one other associated vehicle, and convert the second functional request command signal to second functional request command data; and
executing the logic of the platoon control unit by the processor to communicate the second functional request command data to the associated electronic control unit of the associated following vehicle for operating the associated following vehicle by the associated electronic control unit of the associated following vehicle to execute a second affirmative function according to the second functional request command data;
receiving by the communication receiver a platoon initialization signal from the set of at least one other associated vehicle to the associated following vehicle, and to convert the platoon initialization signal into second platoon initialization data; and executing the logic of the platoon control unit by the processor to communicate the second platoon initialization data to the associated electronic control unit of the associated following vehicle for the initialization of the platoon control between the associated following vehicle and the set of at least one other associated vehicle for operating the associated following vehicle by the associated electronic control unit of the associated following vehicle to cooperatively travel with the set of at least one other associated vehicle comprising as the platoon along an associated roadway.

33. The method according to claim 18, wherein:

transmitting by the communication transmitter at a third time, a third heartbeat signal as a third communication signal from the associated following vehicle, the third heartbeat signal comprising third heartbeat data representative of a continuity of a second communication link at the third time between the associated following vehicle and the set of at least one other associated vehicle;

transmitting by the communication transmitter at a fourth time after the third time, a fourth heartbeat signal as a fourth communication signal from the associated following vehicle, the fourth heartbeat signal comprising fourth heartbeat data representative of the continuity of the second communication link at the fourth time between the associated following vehicle and the set of at least one other associated vehicle;

receiving by the communication receiver a platoon initialization signal from the set of at least one other associated vehicle to the associated following vehicle, and to convert the platoon initialization signal into second platoon initialization data; and executing the logic of the platoon control unit by the processor to communicate the second platoon initialization data to the associated electronic control unit of the associated following vehicle for the initialization of the platoon control between the associated following vehicle and the set of at least one other associated vehicle for operating the associated following vehicle by the associated electronic control unit of the associated following vehicle to cooperatively travel with the set of at least one other associated vehicle comprising as the platoon along an associated roadway.

34. The method according to claim 18, further comprising:

transmitting by the communication transmitter from the associated following vehicle to the set of at least one other associated vehicle, a control profile request signal comprising control profile request data usable by a platoon control unit of the set of at least one other associated vehicle to selectively communicate the control profile request data to an associated electronic control unit of the set of at least one other associated vehicle for operating the set of at least one other associated vehicle by the associated electronic control unit of the set of at least one other associated vehicle according to the control profile request;

receiving by the communication receiver a second platoon initialization signal from the set of at least one other associated vehicle to the associated following vehicle; and executing the logic of the platoon control unit by the processor to communicate the second platoon initialization signal to the associated electronic control unit of the associated following vehicle for the initialization of the platoon control between the associated following vehicle and the set of at least one other associated vehicle for operating the associated following vehicle by the associated electronic control unit of the associated following vehicle to cooperatively travel with the set of at least one other associated vehicle comprising as the platoon along an associated roadway.

* * * * *